United States Patent
Kim et al.

(10) Patent No.: US 11,768,402 B2
(45) Date of Patent: Sep. 26, 2023

(54) DISPLAY DEVICE

(71) Applicant: LG ELECTRONICS INC., Seoul (KR)

(72) Inventors: Seungse Kim, Seoul (KR); Sangmin Baek, Seoul (KR); Junseok Tak, Seoul (KR); Byungwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/850,292

(22) Filed: Jun. 27, 2022

(65) Prior Publication Data
US 2023/0004046 A1    Jan. 5, 2023

(30) Foreign Application Priority Data

Jun. 30, 2021  (KR) .................. 10-2021-0085620

(51) Int. Cl.
*G02F 1/13357* (2006.01)
*G02F 1/1333* (2006.01)

(52) U.S. Cl.
CPC .. *G02F 1/133608* (2013.01); *G02F 1/133382* (2013.01); *G02F 1/133603* (2013.01); *G02F 1/133605* (2013.01); *G02F 1/133606* (2013.01)

(58) Field of Classification Search
CPC ......... G02F 1/133382; G02F 1/133603; G02F 1/133606
USPC ................................. 349/58–68, 72
See application file for complete search history.

(56) References Cited

U.S. PATENT DOCUMENTS

| 2008/0111949 A1* | 5/2008 | Shibata ............. G02F 1/133606 349/64 |
| 2009/0109655 A1* | 4/2009 | Shinozaki ......... G02F 1/133603 362/234 |
| 2009/0135330 A1* | 5/2009 | Kawase ............ G02F 1/133603 362/97.2 |
| 2010/0208452 A1 | 8/2010 | Park |

(Continued)

FOREIGN PATENT DOCUMENTS

| KR | 100845895 | 7/2008 |
| KR | 101592313 | 2/2016 |

(Continued)

OTHER PUBLICATIONS

Korean Intellectual Property Office Application Serial No. 10-2021-0085620, Office Action dated Aug. 22, 2022, 6 pages.

(Continued)

*Primary Examiner* — Charles S Chang
(74) *Attorney, Agent, or Firm* — LEE HONG DEGERMAN KANG WAIMEY

(57) ABSTRACT

Disclosed is a display device. The display device of the present disclosure may include: a display panel; a frame which is located in a rear of the display panel and to which the display panel is coupled; a substrate which is located between the display panel and the frame and coupled to the frame; and a plurality of light sources which are mounted on the substrate and spaced apart from each other, wherein the substrate may include: an elongated first plate; and a plurality of second plates which extend from the first plate in a direction intersecting with a length direction of the first plate, and are spaced apart from each other in the length direction of the first plate.

14 Claims, 25 Drawing Sheets

(56) References Cited

U.S. PATENT DOCUMENTS

| | | | |
|---|---|---|---|
| 2010/0231804 A1* | 9/2010 | Hisakawa | G02F 1/133603 |
| | | | 257/E33.056 |
| 2013/0301241 A1* | 11/2013 | Maeda | G02F 1/133606 |
| | | | 362/97.1 |
| 2014/0009695 A1 | 1/2014 | Kuromizu | |
| 2015/0029710 A1 | 1/2015 | Kim | |
| 2021/0011511 A1 | 1/2021 | Kim | |

FOREIGN PATENT DOCUMENTS

| | | |
|---|---|---|
| KR | 1020170083248 | 7/2017 |
| WO | 2009022661 | 2/2009 |

OTHER PUBLICATIONS

European Patent Office Application Serial No. 22181893.3, Search Report dated Nov. 29, 2022, 9 pages.

* cited by examiner

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2021-0085620, filed on Jun. 30, 2021, the contents of which are hereby incorporated by reference herein in its entirety.

BACKGROUND OF THE INVENTION

1. Field of the Invention

The present disclosure relates to a display device

2. Description of the Related Art

As the information society develops, the demand for display devices is also increasing in various forms. In response to this, in recent years, various display devices such as Liquid Crystal Display Device (LCD), Organic Light Emitting Diode (OLED), and Micro LED have been researched and used.

Among them, the liquid crystal panel of the LCD includes a liquid crystal layer, a TFT substrate and a color filter substrate facing each other with the liquid crystal layer interposed therebetween, and can display an image using light provided from a backlight unit.

In addition, a lot of researches on a structure of a substrate on which a light source such as an LED is mounted have been recently accomplished.

SUMMARY OF THE INVENTION

An object of the present disclosure is to solve the above and other problems. Another object of the present disclosure is to provide a display device capable of reducing manufacturing cost or process cost of a substrate.

Another object of the present disclosure is to provide a display device capable of easily coupling a substrate and a reflective sheet with respect to a frame.

Another object of the present disclosure is to provide a display device capable of providing a gap in consideration of thermal expansion of a plurality of substrates.

Another object of the present disclosure is to provide a display device capable of minimizing formation of dark portion between a plurality of substrates.

In accordance with an aspect of the present disclosure, a display device may include: a display panel; a frame which is located in a rear of the display panel and to which the display panel is coupled; a substrate which is located between the display panel and the frame and coupled to the frame; and a plurality of light sources which are mounted on the substrate and spaced apart from each other, wherein the substrate may include: an elongated first plate; and a plurality of second plates which extend from the first plate in a direction intersecting with a length direction of the first plate, and are spaced apart from each other in the length direction of the first plate.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
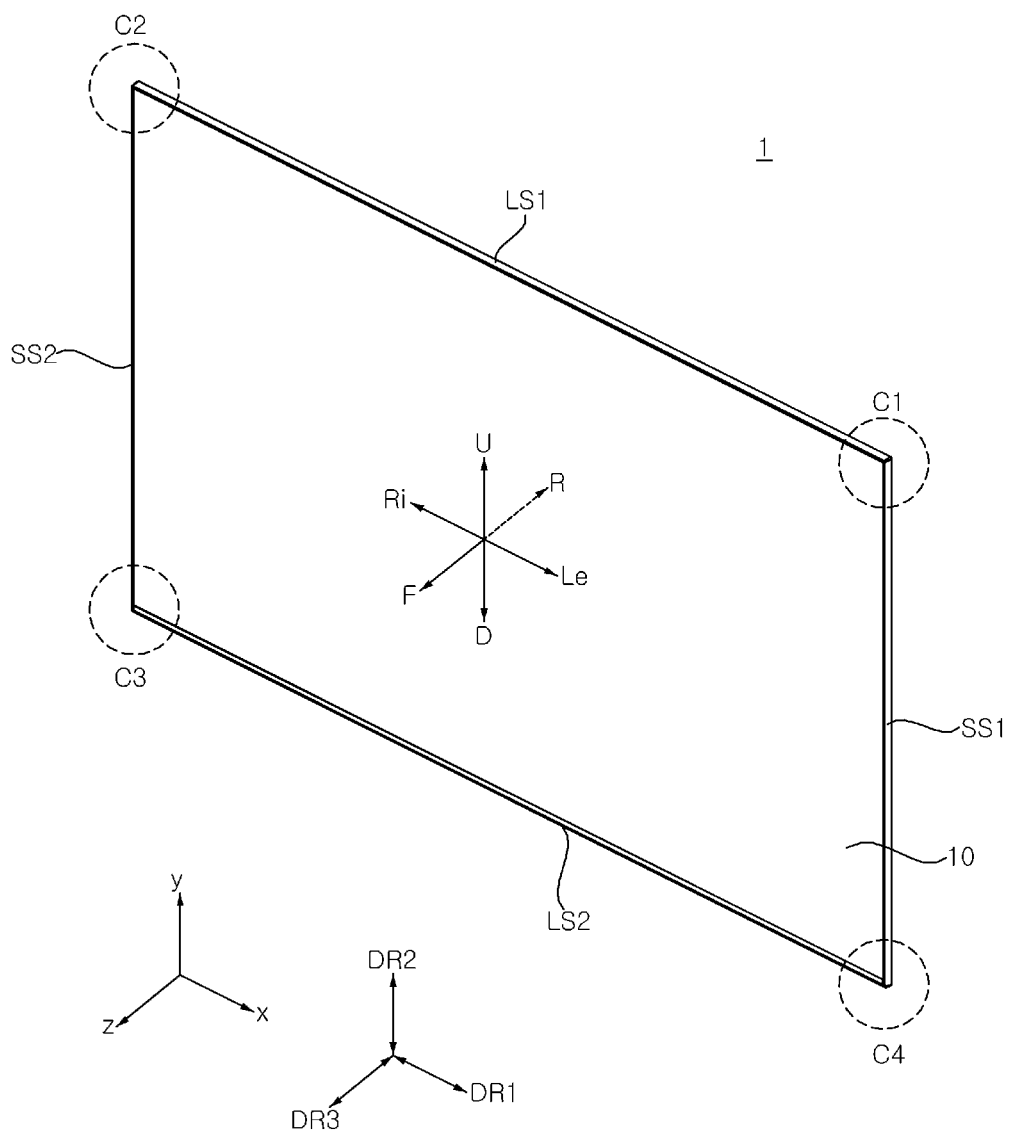
FIGS. 1 to 25 are diagrams illustrating examples of a display device according to embodiments of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings.

In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and spirit of the present disclosure.

Although the terms "first," "second," etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the following description, even if the embodiments are described with reference to specific figures, if necessary, reference numbers not appearing in the specific figures may be referred to, and reference numbers not appearing in the specific figures are used in a case where the above reference numbers appear in the other figures.

Referring to FIG. 1, a display device 1 may include a display panel 10. The display panel 10 may display a screen.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the lengths of the first and second long sides LS1 and LS2 are longer than the lengths of the first and second short sides SS1 and SS2, but it may be possible that the lengths of the first and second long sides LS1 and LS2 are approximately equal to the lengths of the first and second short sides SS1 and SS2.

A direction parallel to the long sides LS1 and LS2 of the display device 1 may be referred to as a left-right direction or a first direction DR1. A direction parallel to the short sides SS1 and SS2 of the display device 1 may be referred to as a vertical direction or a second direction DR2. A direction orthogonal to the long sides LS1 and LS2 and the short sides SS1 and SS2 of the display device 1 may be referred to as a front-rear direction or a third direction DR3.

A direction in which the display panel 10 displays an image may be referred to as a front (F,z), and a direction opposite to the front may be referred to as a rear (R). The side of the first long side LS1 may be referred to as an upper side (U,y). The side of the second long side LS2 may be referred to as a lower side D. The side of the first short side SS1 may be referred to as a left side (Le, x). The side of the second short side SS2 may be referred to as a right side Ri.

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Figure 2:
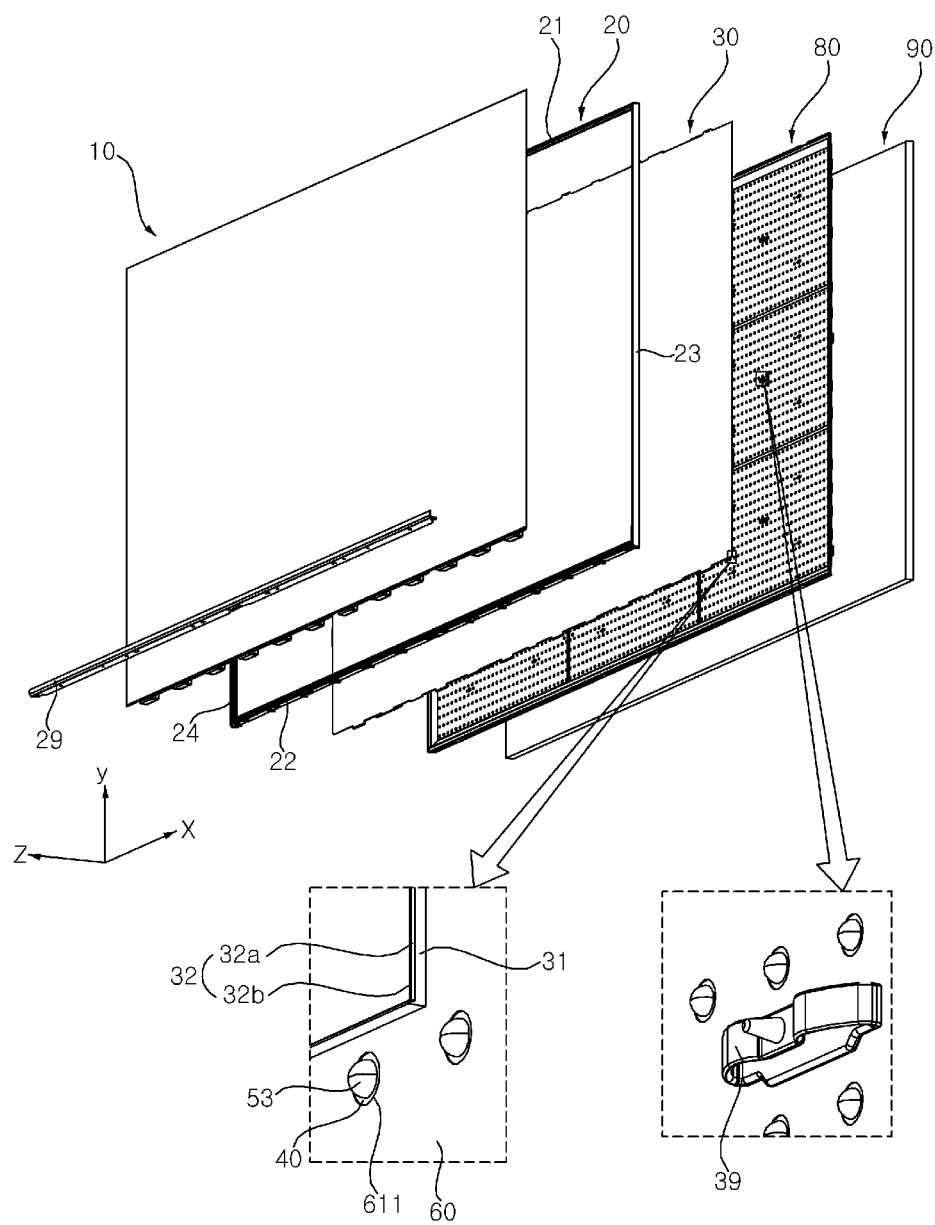

Referring to FIG. 2, the display device may include a display panel 10, a side frame 20, a backlight unit, a frame 80, and a back cover 90.

The display panel 10 may form the front surface of the display device 1 and may display an image. The display panel 10 may display an image in such a manner that a plurality of pixels output red, green or blue (RGB) for each pixel in time. The display panel 10 may be divided into an active area in which an image is displayed and a de-active area in which an image is not displayed. The display panel 10 may include a front substrate and a rear substrate facing each other with a liquid crystal layer interposed therebetween. The display panel 10 may be referred to as an LCD panel.

The front substrate may include a plurality of pixels including red, green, and blue sub-pixels. The front substrate may output light corresponding to a color of red, green, or blue according to a control signal.

The rear substrate may include switching elements. The rear substrate may switch a pixel electrode. For example, the pixel electrode may change the molecular arrangement of the liquid crystal layer according to a control signal applied from the outside. The liquid crystal layer may include liquid crystal molecules. The arrangement of the liquid crystal molecules may be changed according to a voltage difference generated between a pixel electrode and a common electrode. The liquid crystal layer may transmit or block light provided from the backlight unit 20 to the front substrate.

The side frame 20 may extend along the circumference of the display panel 10. The side frame 20 may cover a side surface of the display panel 10. The side frame 20 may be coupled to the display panel 10 and may support the display panel 10. Meanwhile, the side frame 20 may be referred to as a guide panel.

The backlight unit may be located in the rear of the display panel 10. The backlight unit may be coupled to the frame 80 at the front of the frame 80. The backlight unit may be driven by a full driving method or a partial driving method such as local dimming or impulsive. The backlight unit may include light sources providing light forward, a substrate 40 on which the light sources are mounted, lenses 53 covering the light sources, a reflective sheet 60 covering the entire surface of the substrate 40, and an optical unit 30 located in front of the reflective sheet 60.

The optical unit 30 may face the display panel 10 with respect to the side frame 20. The optical unit 30 may evenly transmit the light of the light source to the display panel 10. The optical unit 30 may include a diffuser plate 31 and an optical sheet 32.

The diffuser plate 31 may be located between the reflective sheet 60 and the optical sheet 32. The diffuser plate 31 may diffuse the light of the light source. In addition, an air gap may be formed between the reflective sheet 60 and the diffuser plate 31. The air gap may serve as a buffer, and the light of the light source may be widely spread by the air gap. A supporter 39 may be located between the reflective sheet 60 and the diffuser plate 31, one side may be coupled to the reflective sheet 60, and the other side may support the diffuser plate 31. That is, the supporter 39 may form the air gap. For example, the distance between the light source and the optical sheet 32 may be 10 mm or less.

The optical sheet 32 may be adjacent to or in contact with the front surface of the diffuser plate 31. The optical sheet 32 may include at least one sheet. For example, the optical sheet 32 may include a plurality of sheets having different functions, and the plurality of sheets may be bonded or adhered to each other. For example, the first optical sheet 32a may be a diffusion sheet, and the second optical sheet 32b may be a prism sheet. The diffusion sheet may prevent light emitted from the diffuser plate 31 from being partially concentrated, thereby making light distribution uniform. The prism sheet may collect light emitted from the diffusion sheet and provide the collected light to the display panel 10. In this case, the number and/or position of the diffusion sheet and the prism sheet may be changed.

For example, the optical sheet 32 may change the wavelength or color of light provided from the light source. For example, the optical sheet 32 may include a red-based phosphor and/or a green-based phosphor. In this case, the light source may provide blue-based light, and the optical sheet 32 may convert the light of the light source into white light. Meanwhile, the optical sheet 32 may be referred to as a Quantum Dot (QD) Sheet.

The frame 80 may be located in the rear of the backlight unit. The display panel 10, the side frame 20, and the backlight unit may be coupled to the frame 80. The frame 80 may support the components of the display device described above and below. For example, the frame 80 may include a metal material such as an aluminum alloy. Meanwhile, the frame 80 may be referred to as a main frame or a module cover.

The back cover 90 may cover the rear of the frame 80, and may be coupled to the frame 80. For example, the back cover 90 may be an injection molded product made of a resin material. As another example, the back cover 90 may include a metal material.

Figure 3:
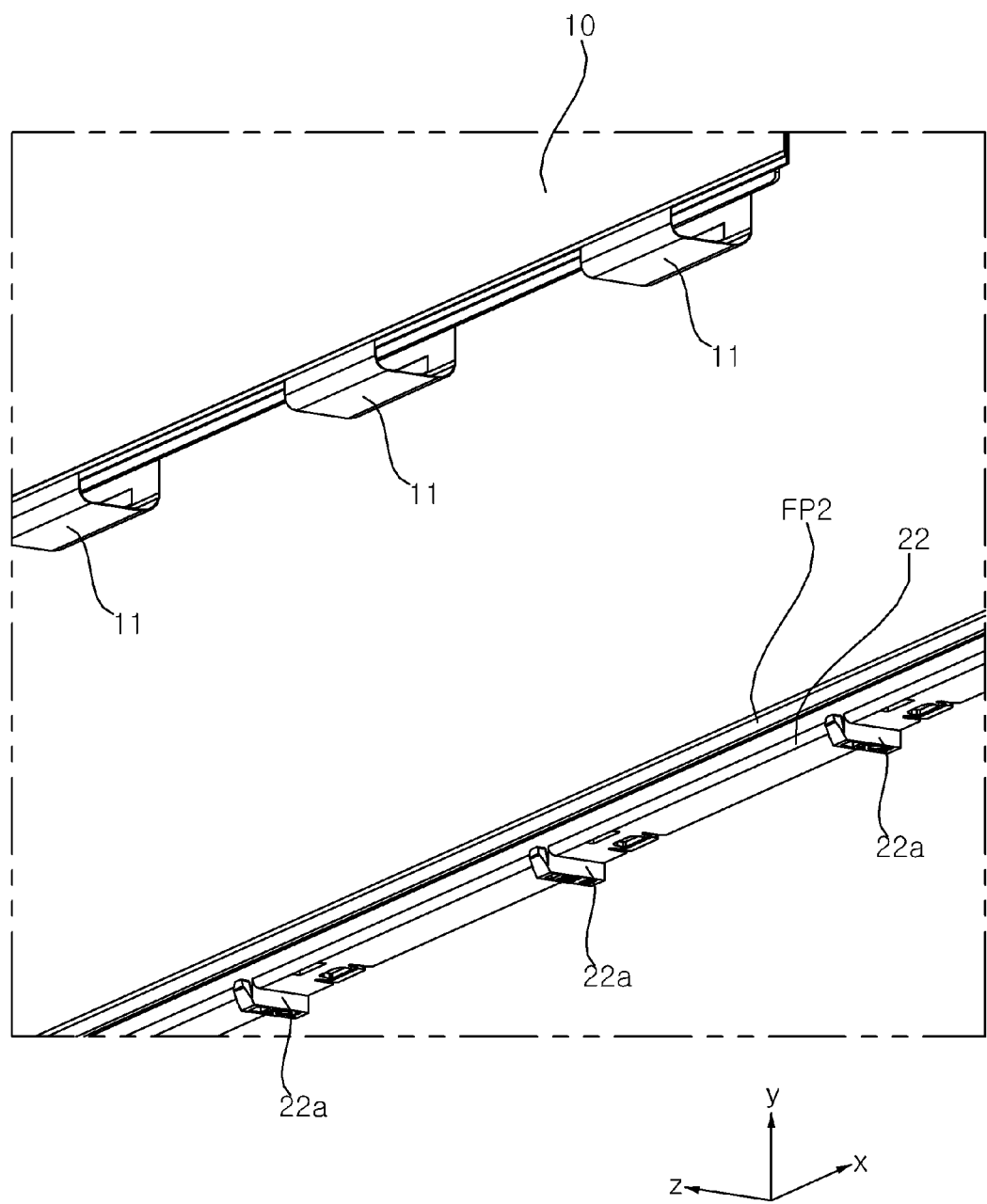
Figure 4:
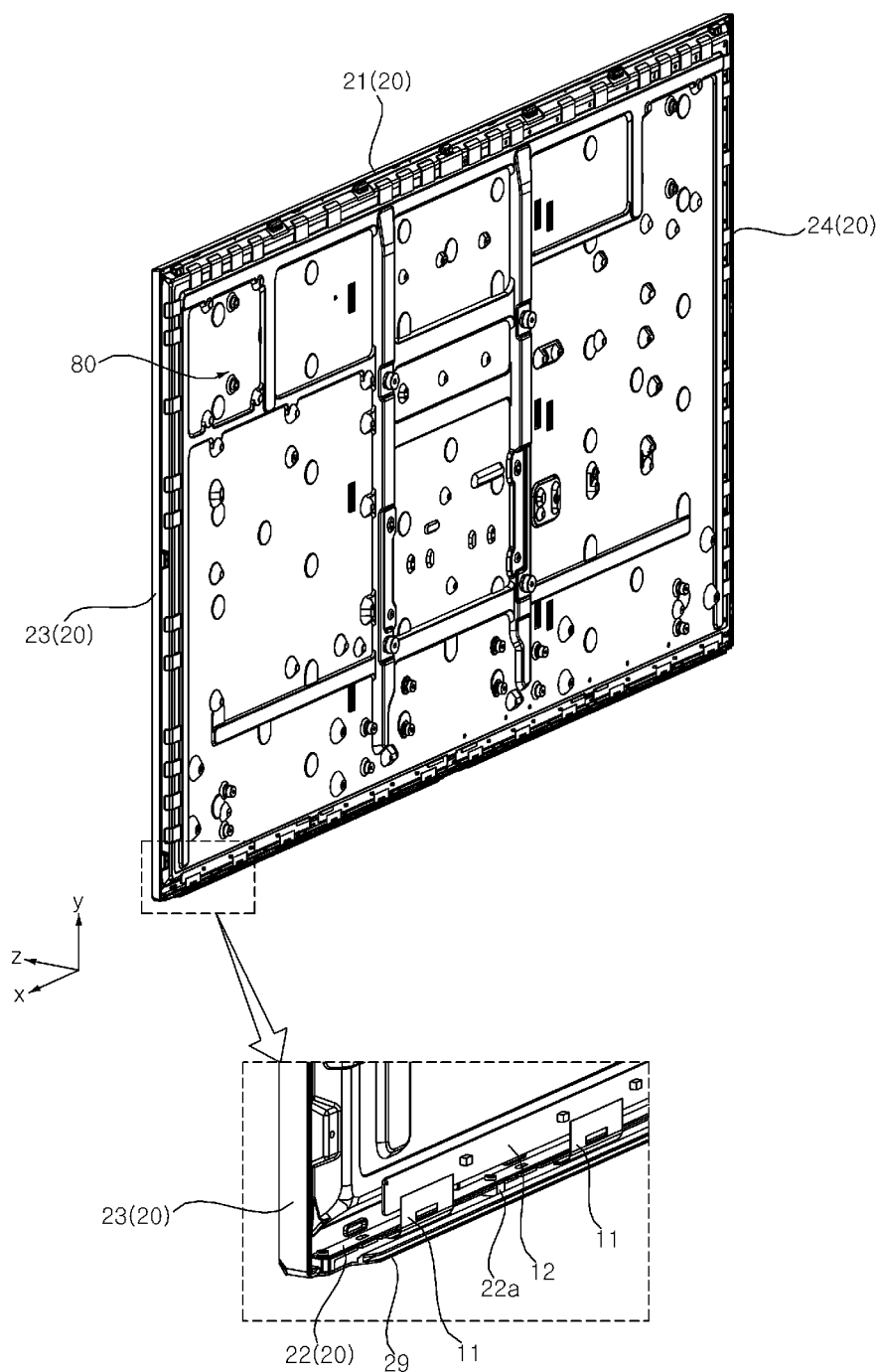

Referring to FIGS. 3 and 4, the side frame 20 may include a first part 21, a second part 22, a third part 23, and a fourth part 24. The first part 21 may extend along an upper side of the display panel 10 and form a first long side LS1 (see FIG. 1). The second part 22 may extend along a lower side of the display panel 10. The third part 23 may extend along the left side of the display panel 10 and may form the first short side SS1 (see FIG. 1). The fourth part 24 may extend along the right side of the display panel 10 and may form a second short side SS2 (see FIG. 1).

An under cover 29 may extend along the second part 22 and may be coupled to the second part 22 at the lower side of the second part 22. The under cover 29 may cover the lower side of the second part 22 and may form a second long side LS2 (see FIG. 1). A plurality of protrusions 22a may protrude from the lower side of the second part 22 toward the under cover 29 and may be spaced apart from each other in the length direction of the second part 22.

One end of the cable 11 may be connected to the lower side of the display panel 10, and the other end of the cable 11 may be located in the rear of the frame 80. A source printed circuit board (S-PCB) 12 may be located in the rear of the frame 80 adjacent to the lower side of the frame 80, and may be connected to the other end of the cable 11. A portion between one end and the other end of the cable 11 may be disposed between the second part 22 and the under cover 29. The cables 11 may be disposed between the protrusions 22a. For example, the cable 11 may be a flexible flat cable (FFC).

Figure 5:
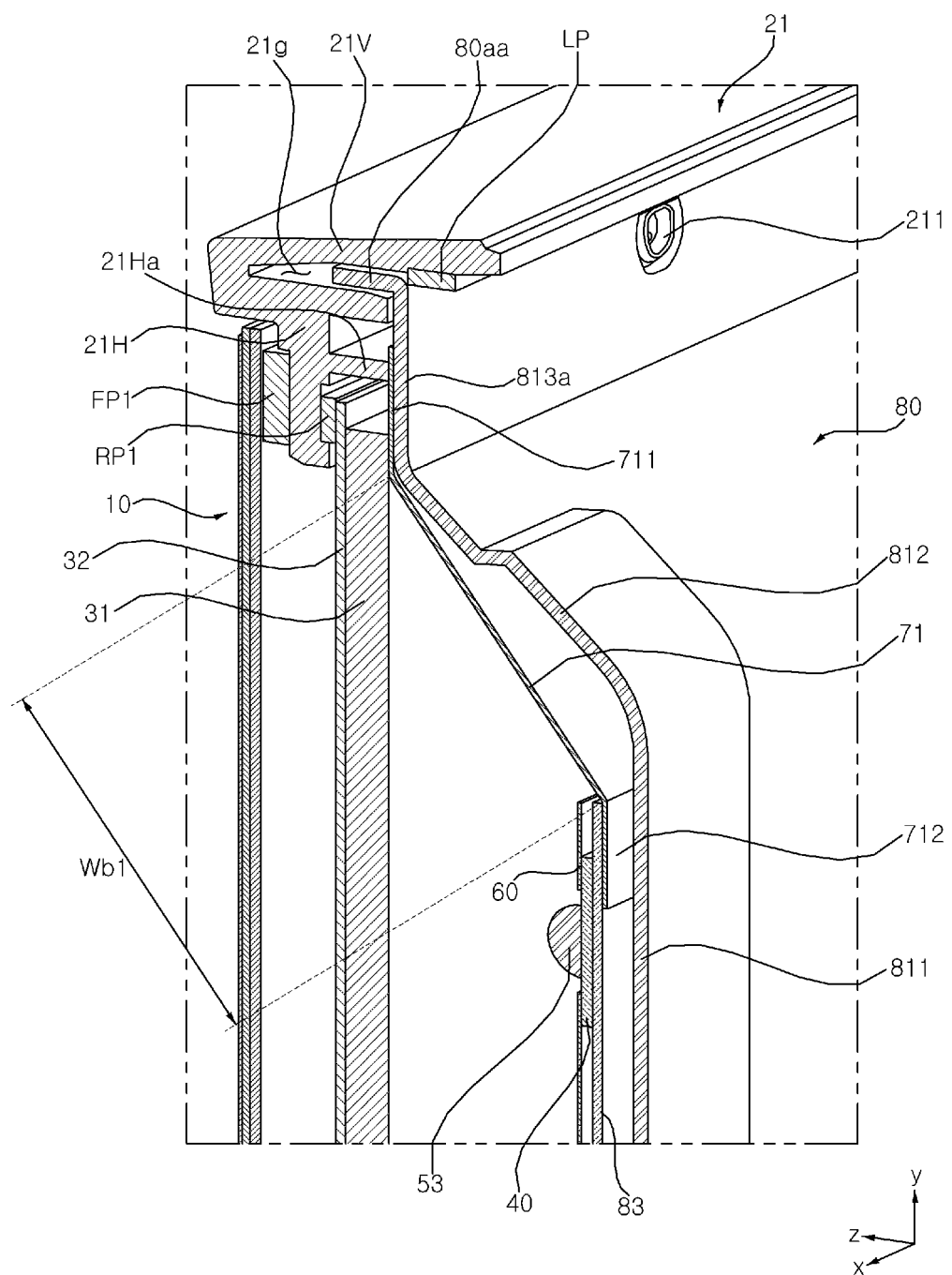

Referring to FIG. 5, the first part 21 may cover the upper sides of the display panel 10 and the frame 80. The first part 21 may include a first vertical portion 21V and a first horizontal portion 21H. The first vertical portion 21V and the first horizontal portion 21H may extend in the left-right direction.

The first vertical portion 21V may form an upper side of the first part 21 and may form a first long side LS1 (see FIG. 1). The first vertical portion 21V may have a width in a direction intersecting with the display panel 10. In other words, the length of the first vertical portion 21V may be defined in the left-right direction, the width of the first vertical portion 21V may be defined in the front-rear direction, and the thickness of the first vertical portion 21V may be defined in the vertical direction. Meanwhile, a first groove 21g may be formed from the rear surface of the first vertical portion 21V toward the inside of the first vertical portion 21V, and may be inserted to an upper end 80aa of the frame 80.

The first horizontal portion 21H may protrude into between the display panel 10 and the optical sheet 32 from the lower side of the first vertical portion 21V. The first horizontal portion 21H may be disposed in parallel to the display panel 10 at the rear of the display panel 10. In other words, the length of the first horizontal portion 21H may be defined in the left-right direction, the width of the first horizontal portion 21H may be defined in the vertical direction, and the thickness of the first horizontal portion 21H may be defined in the front-rear direction. Meanwhile, a first front pad FP1 may be located between the display panel 10 and the first horizontal portion 21H, and may be coupled to the front surface of the first horizontal portion 21H. In addition, a first rear pad RP1 may be located between the display panel 10 and the optical sheet 32, and may be coupled to the rear surface of the first horizontal portion 21H.

Figure 6:
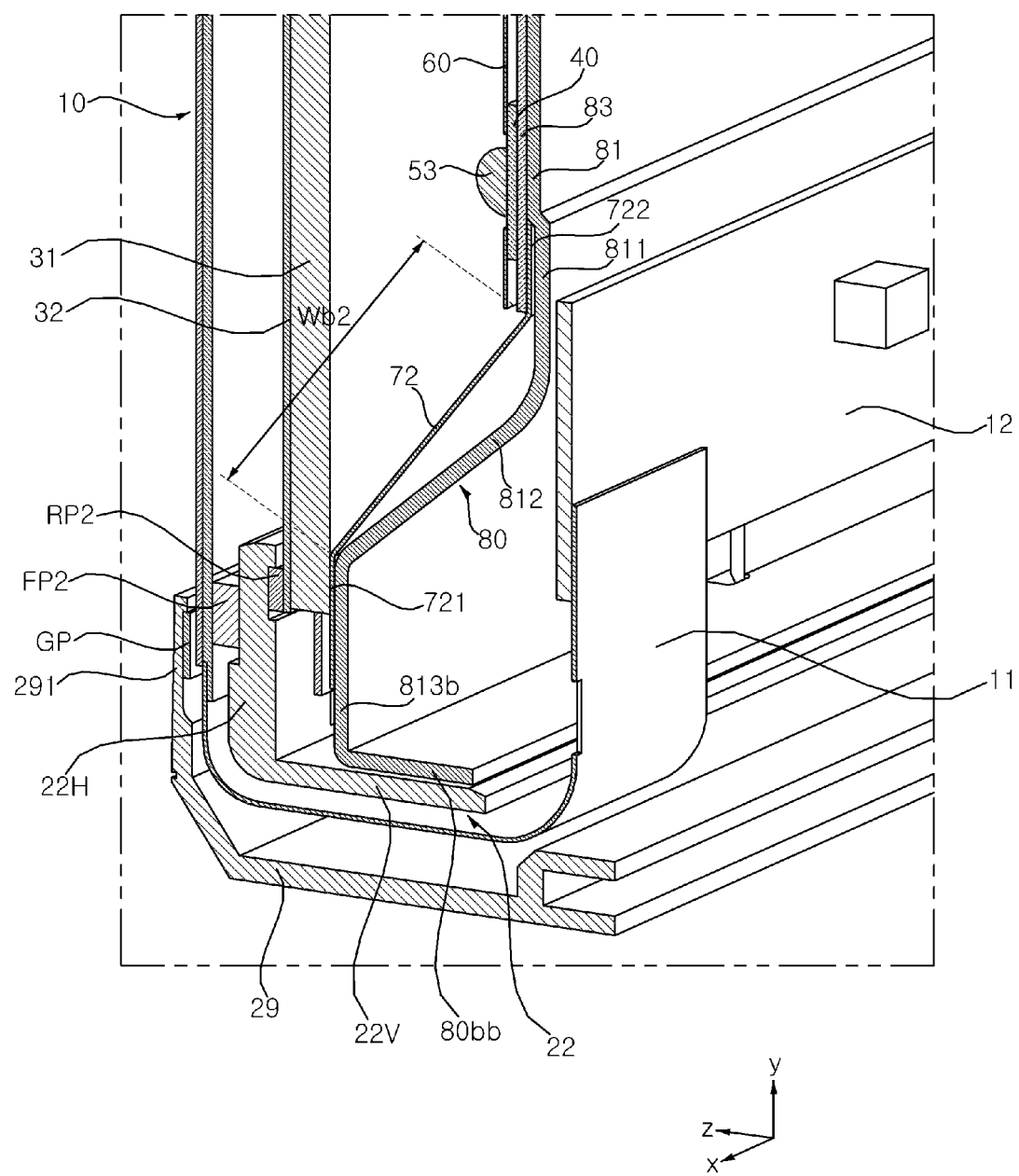

Referring to FIG. 6, the second part 22 may cover the lower side of the frame 80. The second part 22 may include a second vertical portion 22V and a second horizontal portion 22H. The second vertical portion 22V and the second horizontal portion 22H may extend in the left-right direction.

The second vertical portion 22V may form a lower side of the second part 22. The second vertical portion 22V may have a width in a direction intersecting with the display panel 10. In other words, the length of the second vertical portion 22V may be defined in the left-right direction, the width of the second vertical portion 22V may be defined in the front-rear direction, and the thickness of the second vertical portion 22V may be defined in the vertical direction.

Meanwhile, the lower end 80bb of the frame 80 may be seated inside the second vertical portion 22V.

The second horizontal portion 22H may protrude into between the display panel 10 and the optical sheet 32 at the front end of the second vertical portion 22V. The second horizontal portion 22H may be disposed in parallel with the display panel 10 at the rear of the display panel 10. In other words, the length of the second horizontal portion 22H may be defined in the left-right direction, the width of the second horizontal portion 22H may be defined in the vertical direction, and the thickness of the second horizontal portion 22H may be defined in the front-rear direction. Meanwhile, a second front pad FP2 may be located between the display panel 10 and the second horizontal portion 22H, and may be coupled to the front surface of the second horizontal portion 22H. In addition, a second rear pad RP2 may be located between the display panel 10 and the optical sheet 32, and may be coupled to the rear surface of the second horizontal portion 22H.

Meanwhile, the under cover 29 may cover the lower sides of the display panel 10 and the second part 22. The front cover 291 may protrude upward from the front end of the under cover 29 and may cover the lower portion of the front surface of the display panel 10. A gap pad GP may be located between the front cover 291 and the display panel 10, and may be coupled to the rear surface of the front cover 291.

Figure 7:
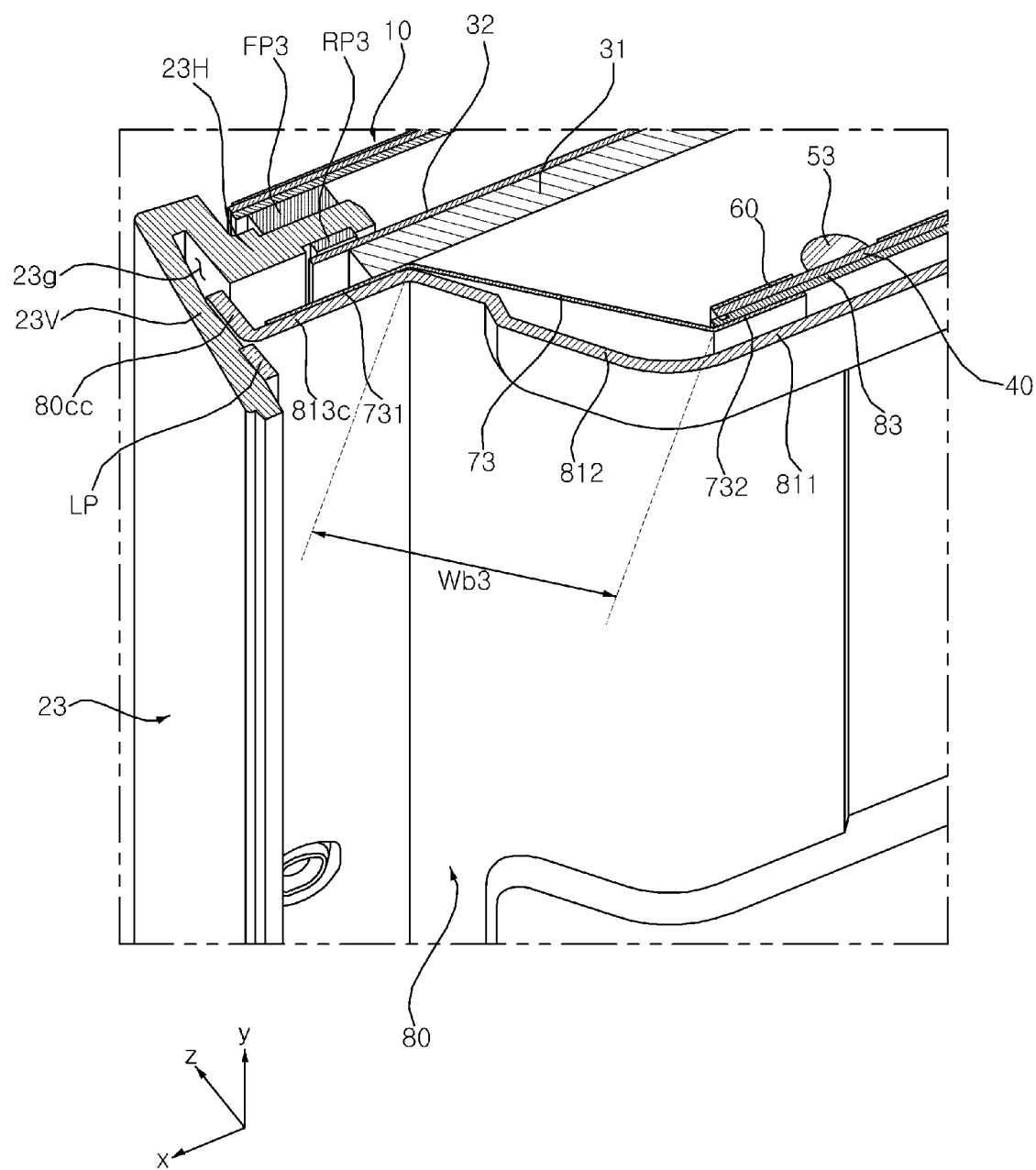

Referring to FIG. 7, the third part 23 may cover the left sides of the display panel 10 and the frame 80. The third part 23 may include a third vertical portion 23V and a third horizontal portion 23H. The third vertical portion 23V and the third horizontal portion 23H may extend in the vertical direction.

The third vertical portion 23V may form a left side of the third part 23 and may form a first short side SS1 (see FIG. 1). The third vertical portion 23V may have a width in a direction intersecting the display panel 10. In other words, the length of the third vertical portion 23V may be defined in the vertical direction, the width of the third vertical portion 23V may be defined in the front-rear direction, and the thickness of the third vertical portion 23V may be defined in the left-right directions. Meanwhile, the third groove 23g may be formed from the rear surface of the third vertical portion 23V toward the inside of the third vertical portion 23V, and the left end 80cc of the frame 80 may be inserted thereinto.

The third horizontal portion 23H may protrude into between the display panel 10 and the optical sheet 32 in the right side of the third vertical portion 23V. The third horizontal portion 23H may be disposed in parallel to the display panel 10 at the rear of the display panel 10. In other words, the length of the third horizontal portion 23H may be defined in the vertical direction, the width of the third horizontal portion 23H may be defined in the left-right direction, and the thickness of the third horizontal portion 23H may be defined in the front-rear direction. Meanwhile, a third front pad FP3 may be located between the display panel 10 and the third horizontal portion 23H, and may be coupled to the front surface of the third horizontal portion 23H. In addition, a third rear pad RP3 may be located between the display panel 10 and the optical sheet 32, and may be coupled to the rear surface of the third horizontal portion 23H.

Figure 8:
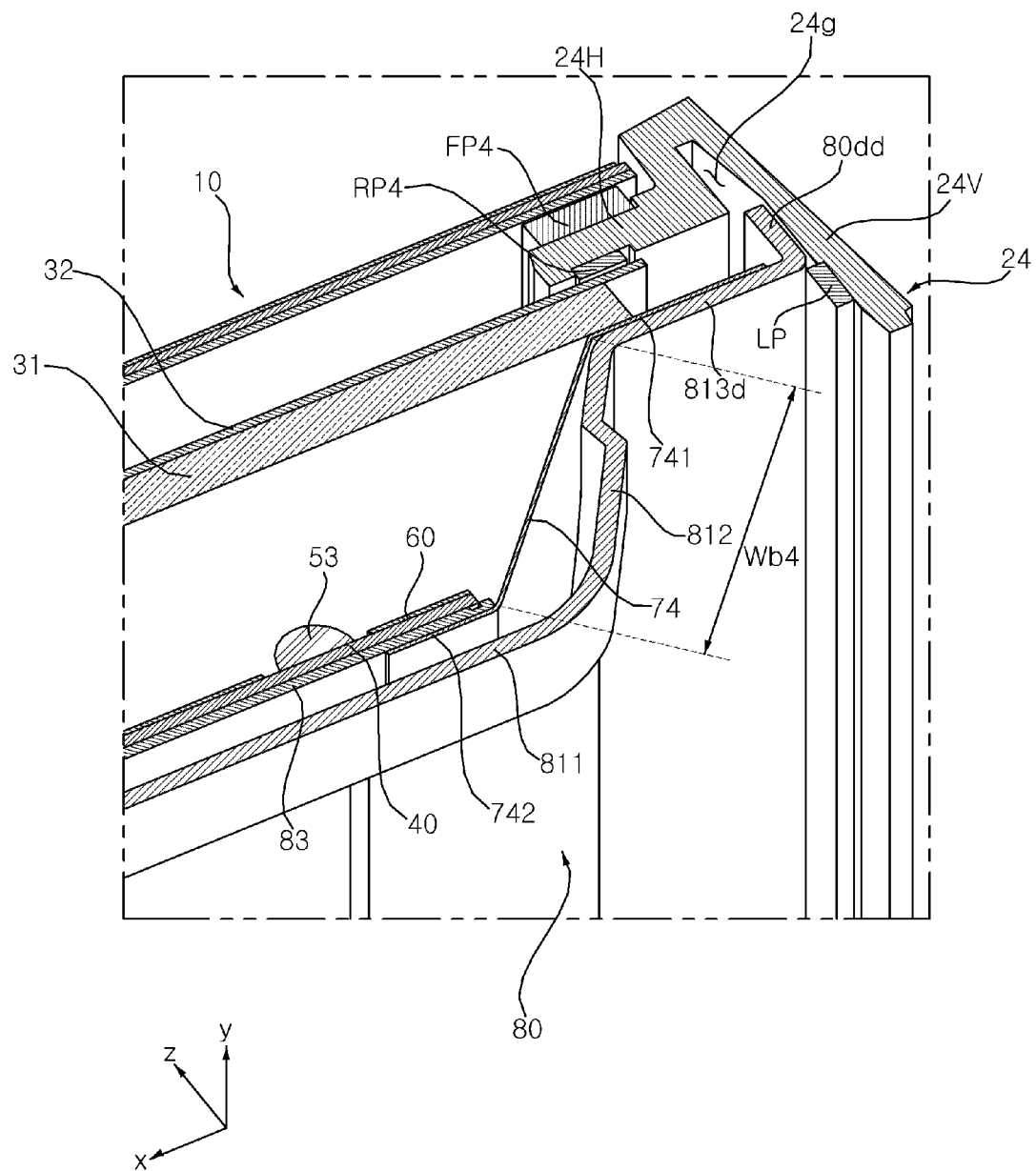

Referring to FIG. 8, a fourth part 24 may cover the right sides of the display panel 10 and the frame 80. The fourth part 24 may include a fourth vertical portion 24V and a fourth horizontal portion 24H. The fourth vertical portion 24V and the fourth horizontal portion 24H may extend in the vertical direction.

The fourth vertical portion 24V may form a right side of the fourth part 23 and may form a second short side SS2 (see FIG. 1). The fourth vertical portion 24V may have a width in a direction intersecting with the display panel 10. In other words, the length of the fourth vertical portion 24V may be defined in the vertical direction, the width of the fourth vertical portion 24V may be defined in the front-rear direction, and the thickness of the fourth vertical portion 24V may be defined in the left-right direction. Meanwhile, a fourth groove 24g may be formed from the rear surface of the fourth vertical portion 24V toward the inner side of the fourth vertical portion 24V, and a right end 80dd of the frame 80 may be inserted thereinto.

The fourth horizontal portion 24H may protrude into between the display panel 10 and the optical sheet 32 at the left side of the fourth vertical portion 24V. The fourth horizontal portion 24H may be disposed in parallel to the display panel 10 at the rear of the display panel 10. In other words, the length of the fourth horizontal portion 24H may be defined in the vertical direction, the width of the fourth horizontal portion 24H may be defined in the left-right direction, and the thickness of the fourth horizontal portion 24H may be defined in the front-rear direction. Meanwhile, a fourth front pad FP4 may be located between the display panel 10 and the fourth horizontal portion 24H, and may be coupled to the front surface of the fourth horizontal portion 24H. In addition, the fourth rear pad RP4 may be located between the display panel 10 and the optical sheet 32, and may be coupled to the rear surface of the fourth horizontal portion 24H.

Figure 9:
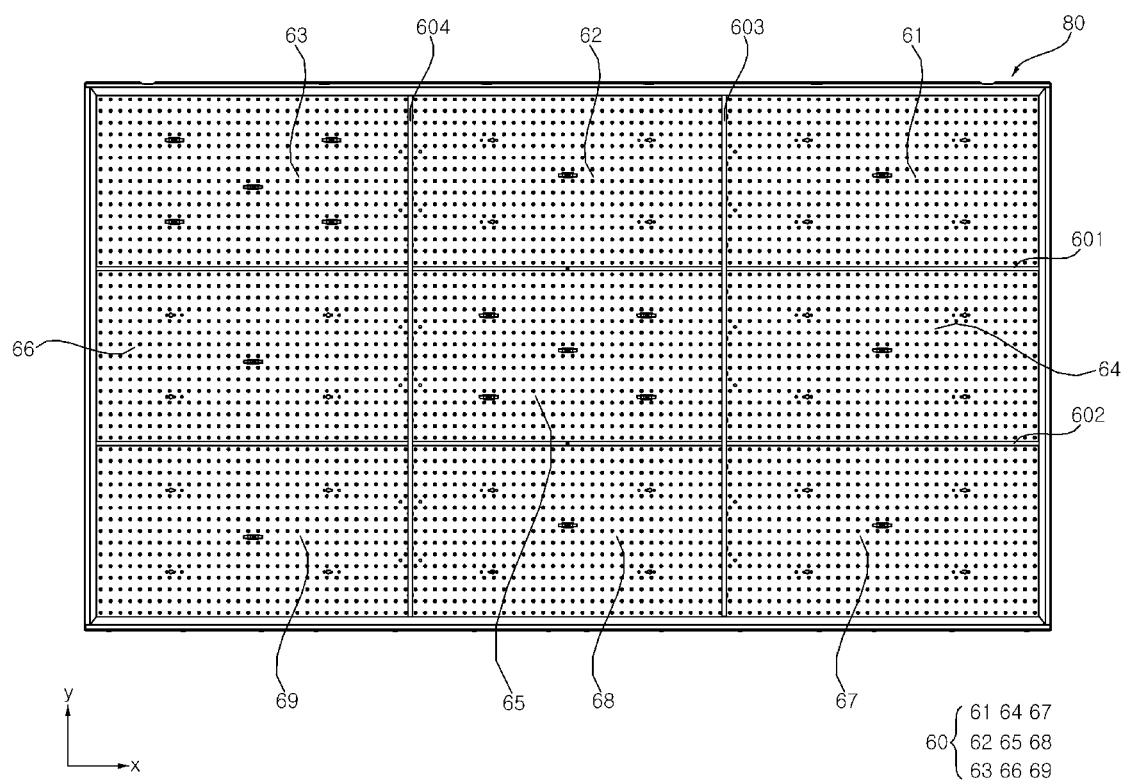
Figure 10:
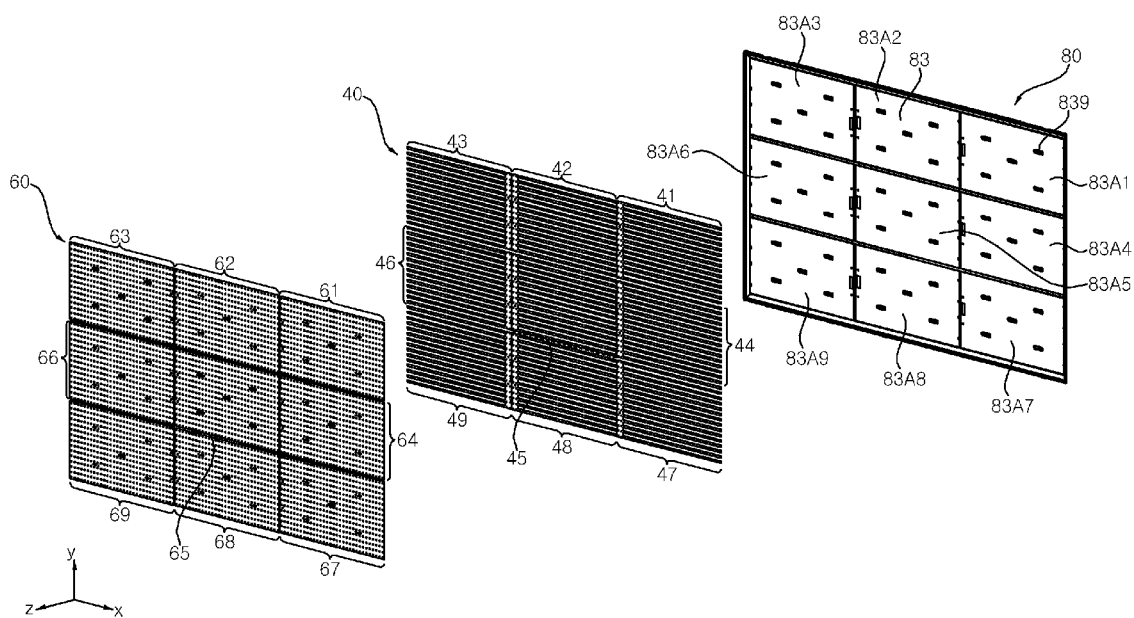

Referring to FIGS. 9 and 10, a heat sink 83 may be located in front of the frame 80, and may be coupled to the frame 80. That is, the heat sink 83 may be provided on the front surface of the frame 80. The heat sink 83 may cover the central area of the frame 80. The heat sink 83 may provide a flat front surface on which the substrate 40 is installed.

The substrate 40 may be located in front of the heat sink 83, and may be coupled to the heat sink 83. That is, the substrate 40 may be provided on the front surface of the heat sink 83. For example, the substrate 40 may include at least one of polyethylene terephthalate (PET), glass, polycarbonate (PC), and silicon. The substrate 40 may be a printed circuit board (PCB). At least one substrate 40 may be provided. The substrate 40 may include a plurality of substrates 40 adjacent to each other. A first substrate 41, a second substrate 42, a third substrate 43, a fourth substrate 44, a fifth substrate 45, a sixth substrate 46, a seventh substrate 47, an eighth substrate 48, and a ninth substrate 49 may be disposed on a virtual horizontal plane (i.e. XY plane). In this case, the heat sink 83 may be divided into a plurality of areas, and each of the plurality of substrates 40 may be coupled to each of the plurality of areas.

The reflective sheet 60 may be a rectangular sheet. The reflective sheet 60 may be located in front of the substrate 40, and may be coupled to the reflective sheet 60. That is, the reflective sheet 60 may be provided on the front surface of the substrate 40. For example, the reflective sheet 60 may include at least one of metal and metal oxide which are reflective material. For example, the reflective sheet 60 may include a metal and/or a metal oxide having a high reflectance such as at least one of aluminum (Al), silver (Ag), gold (Au), and titanium dioxide (TiO2). For example, a resin may be deposited or applied on the reflective sheet 60, and may diffuse light from the light source 51 (see FIG. 19). At least one reflective sheet 60 may be provided. The reflective sheet 60 may include a plurality of reflective sheets 60 adjacent to each other. A first reflective sheet 61, a second reflective sheet 62, a third reflective sheet 63, a fourth reflective sheet 64, a fifth reflective sheet 65, a sixth reflective sheet 66, a seventh reflective sheet 67, an eighth reflective sheet 68, and a ninth reflective sheet 69 may be disposed on a virtual horizontal plane (i.e. a XY plane). In this case, each of the plurality of reflective sheets 60 may be coupled to each of the plurality of substrates 40. Accordingly, the reflective sheet 60 may reflect forward the light of the light source 51 (see FIG. 19) mounted in the substrate 40.

A first area 83A1 may form a corner where the upper side and the left side of the heat sink 83 meet, and the first substrate 41 and the first reflective sheet 61 may be arranged in the first area 83A1. A second area 83A2 may form a central portion of the upper side of the heat sink 83, and the second substrate 42 and the second reflective sheet 62 may be arranged in the second area 83A2. A third area 83A3 may form a corner where the upper side and the right side of the heat sink 83 meet, and the third substrate 43 and the third reflective sheet 63 may be arranged in the third area 83A3. A fourth area 83A4 may form a central portion of the left side of the heat sink 83, and the fourth substrate 44 and the fourth reflective sheet 64 may be arranged in the fourth area 83A4. A fifth area 83A5 may form a central portion of the heat sink 83, and the fifth substrate 45 and the fifth reflective sheet 65 may be arranged in the fifth area 83A5. A sixth area 83A6 may form a central portion of the right side of the heat sink 83, and the sixth substrate 46 and the sixth reflective sheet 66 may be arranged in the sixth area 83A6. A seventh area 83A7 may form a corner where the left side and the lower side of the heat sink 83 meet, and the seventh substrate 47 and the seventh reflective sheet 67 may be arranged in the seventh area 83A7. An eighth area 83A8 may form a central portion of the lower side of the heat sink 83, and the eighth substrate 48 and the eighth reflective sheet 68 may be arranged in the eighth area 83A8. A ninth area 83A9 may form a corner where the right side and the lower side of the heat sink 83 meet, and the ninth substrate 49 and the ninth reflective sheet 69 may be arranged in the ninth area 83A9.

Figure 11:
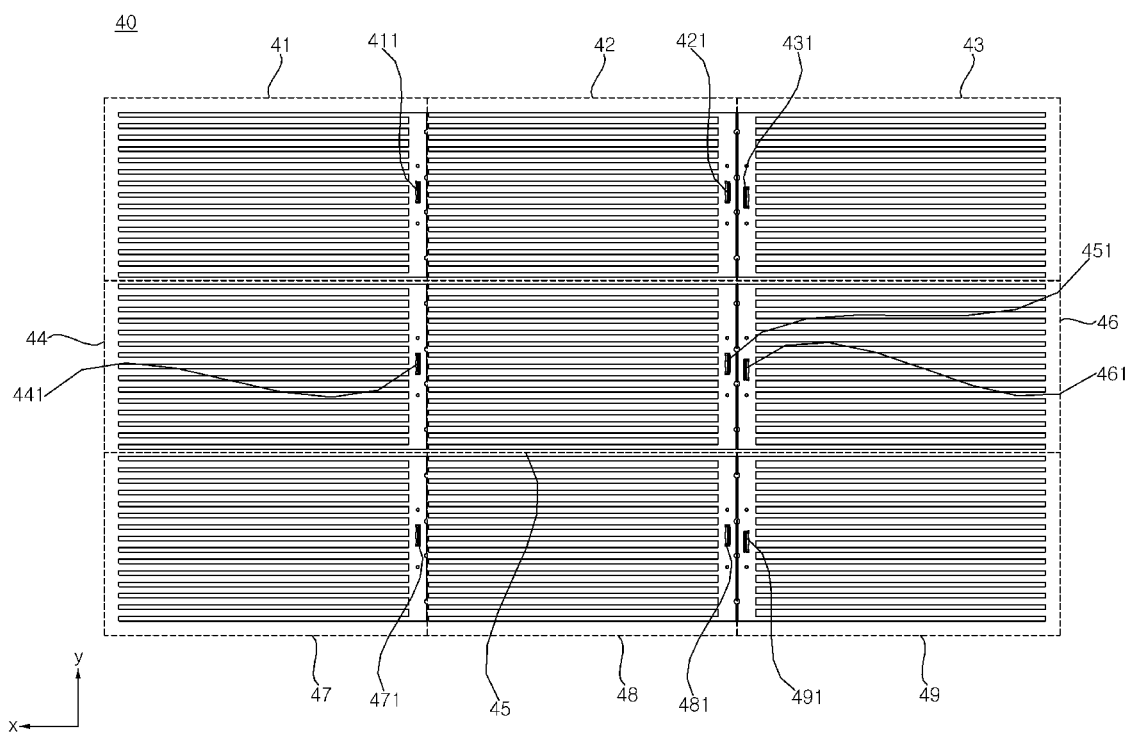

Referring to FIG. 11, connectors 411, 421, 431, 441, 451, 461, 471, 481, and 491 may be mounted on the rear surface of the substrate 40, and may be electrically connected to a power device (not shown).

A first connector 411 may be mounted on the rear surface of the first substrate 41. A second connector 421 may be mounted on the rear surface of the second substrate 42. A third connector 431 may be mounted on the rear surface of the third substrate 43. A fourth connector 441 may be mounted on the rear surface of the fourth substrate 44. A fifth connector 451 may be mounted on the rear surface of the fifth substrate 45. A sixth connector 461 may be mounted on the rear surface of the sixth substrate 46. A seventh connector 471 may be mounted on the rear surface of the seventh substrate 47. An eighth connector 481 may be mounted on the rear surface of the eighth substrate 48. A ninth connector 491 may be mounted on the rear surface of the ninth substrate 49.

The second connector 421 may be disposed between the first connector 411 and the third connector 431, and may be adjacent to any one of the first connector 411 and the third connector 431. The fifth connector 451 may be disposed between the fourth connector 441 and the sixth connector 461, and may be adjacent to any one of the fourth connector 441 and the sixth connector 461. The eighth connector 481 may be disposed between the seventh connector 471 and the ninth connector 491, and may be adjacent to any one of the seventh connector 471 and the ninth connector 491.

Meanwhile, connector holes 83h, 81h (see FIGS. 12 and 15) may be formed to penetrate the heat sink 83 and a flat plate portion 81, and connectors 411, 421, 431, 441, 451, 461, 471, 481, 491 may be inserted thereinto.

Figure 12:
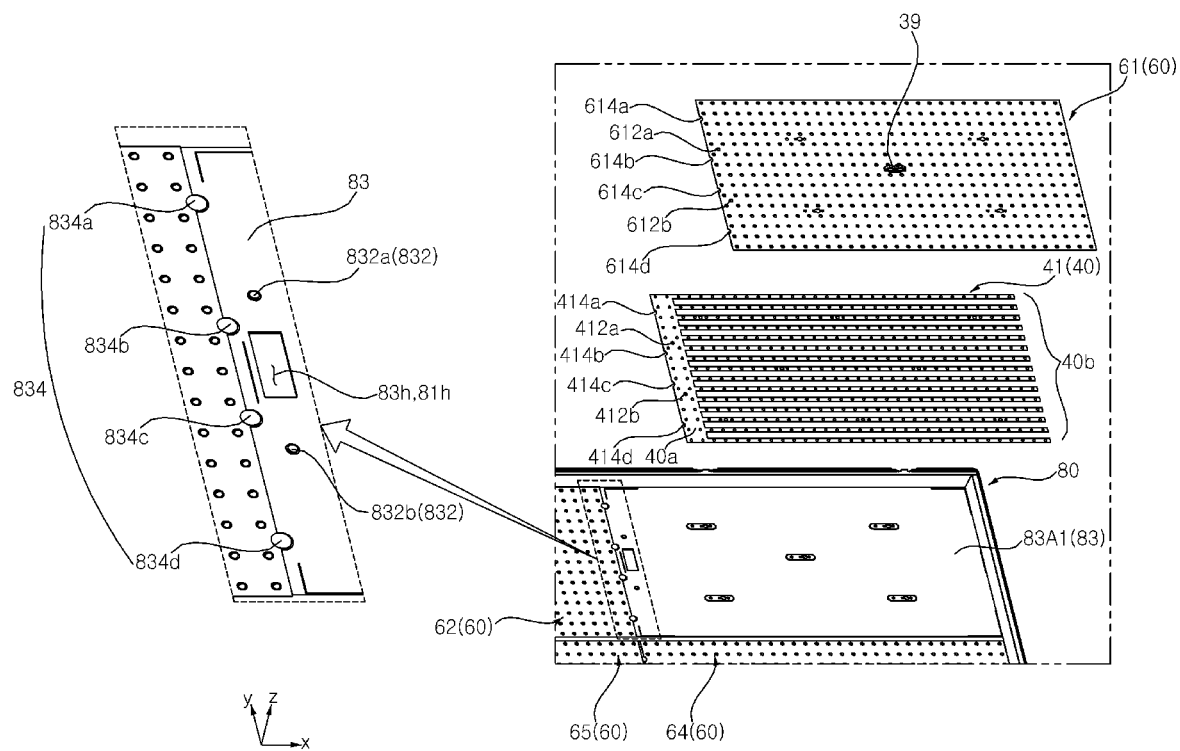

Referring to FIG. 12, the first substrate 41 may be coupled to the first area 83A1 of the heat sink 83, and the first reflective sheet 61 may be coupled to the first substrate 41. A first adhesive member 85 (see FIG. 19) may be coupled to the heat sink 83 and the first substrate 41, at between the heat sink 83 and the first substrate 41. For example, the adhesive member 85 may be a double-sided tape. A second adhesive member (not shown) may be coupled to the first substrate 41 and the first reflective sheet 61, at between the first substrate 41 and the first reflective sheet 61. For example, the second adhesive member may be a double-sided tape. Accordingly, the first substrate 41 and the first reflective sheet 61 can be modularized, and the coupling process of the first substrate 41 and the first reflective sheet 61 with respect to the heat sink 83 can be efficiently improved.

The first substrate 41 may include a first plate 40a and a plurality of second plates 40b. The first substrate 41 may have a fork-type shape as a whole. Meanwhile, the first plate 40a may be referred to as a vertical plate or body, and the second plate 40b may be referred to as a horizontal plate or rib.

Specifically, the first plate 40a may be elongated. For example, the length direction of the first plate 40a may be parallel to the vertical direction. The first connector 411 (see FIG. 11) may be mounted on the rear surface of the first plate 40a. The plurality of second plates 40b may extend from one long side of the first plate 40a in a direction intersecting with the length direction of the first plate 40a, and may be separated from each other in the length direction of the first plate 40a. The length direction of a plurality of second plates 40b may be parallel to the left-right direction, and the direction in which a plurality of second plates 40b are spaced apart from each other may be parallel to the vertical direction. A length of each of the plurality of second plates 40b may be greater than a length of the first plate 40a. The width of the first plate 40a may be defined in the length direction of the plurality of second plates 40b. A width of each of the plurality of second plates 40b may be defined in the length direction of the first plate 40a and may be smaller than a width of the first plate 40a.

Meanwhile, the description of the first substrate 41 and the first reflective sheet 61 described above may be identically applied to the remaining substrates 42, 43, 44, 45, 46, 47, 48, 49 (see FIG. 10) and the remaining reflective sheets 62, 63, 64, 65, 66, 67, 68, 69 (see FIG. 10). In addition, the description of the coupling of the first substrate 41 and the first reflective sheet 61 with respect to the heat sink 83 may be identically applied to the coupling of the remaining substrates 42, 43, 44, 45, 46, 47, 48, 49 (see FIG. 10) and the remaining reflective sheets 62, 63, 64, 65, 66, 67, 68, 69 (see FIG. 10) with respect to the heat sink 83.

For example, the first substrate 41 may have substantially the same shape as the remaining substrates 42, 43, 44, 45, 46, 47, 48, 49 (see FIG. 10). For example, one substrate may be separated into any two of the substrates 40 through a cutting process. Accordingly, the manufacturing cost of the substrate 40 may be reduced.

Figure 13:
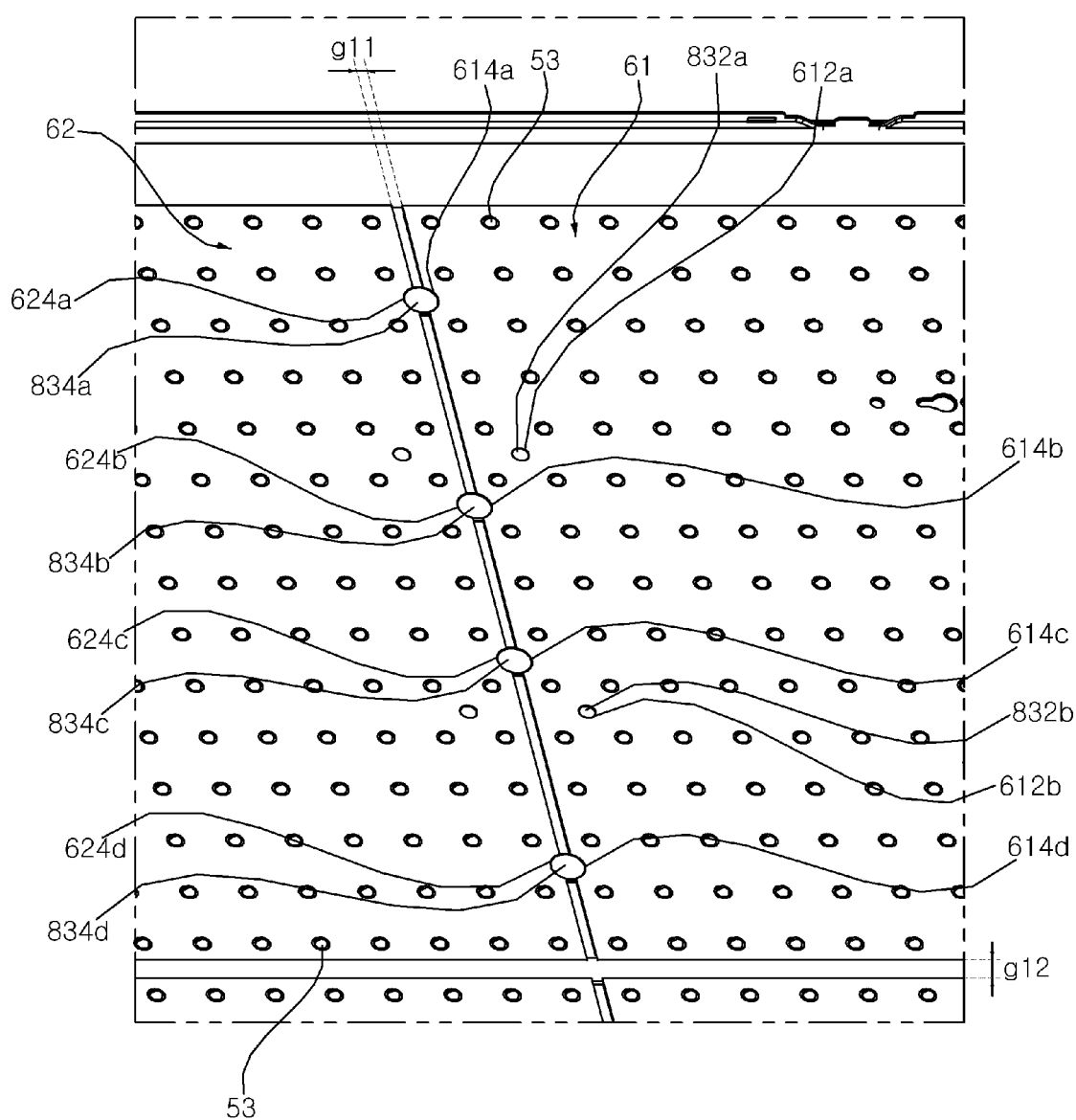
Figure 14:
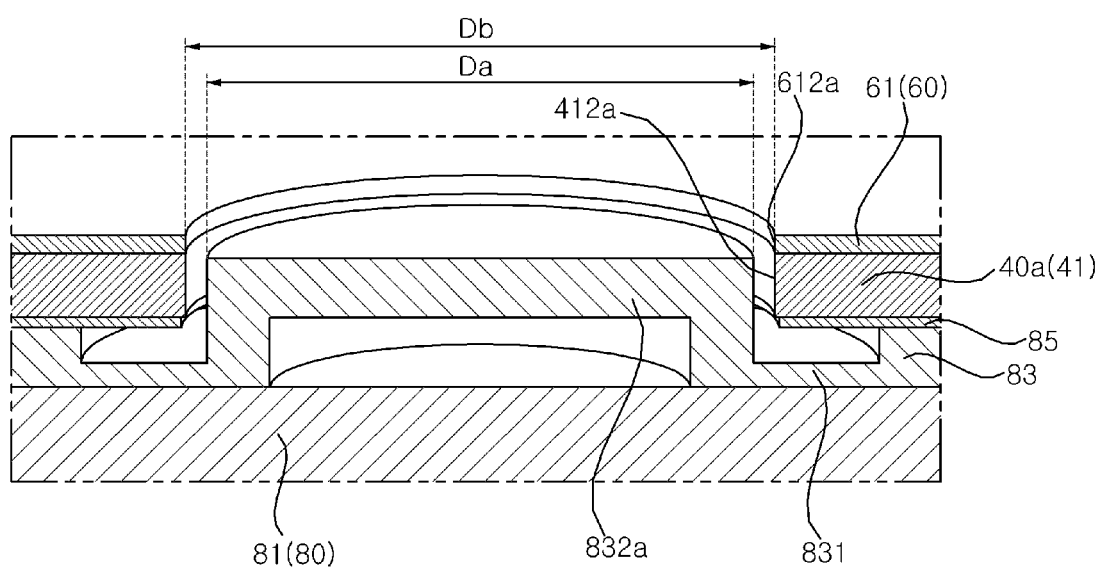

Referring to FIGS. 12 to 14, a plurality of adjacent substrates 40 may be spaced apart from each other, and a plurality of adjacent reflective sheets 60 may be spaced apart from each other. For example, the first substrate 41 and the second substrate 42 may be spaced apart from each other by a certain gap g11 in the left-right direction, and the first reflective sheet 61 and the second reflective sheet 62 may be spaced apart from each other by a certain gap g11 in the left-right direction. In this case, the gap g11 may be formed to be elongated in the vertical direction. For example, the gap g11 may be about 3 mm. In addition, the first substrate 41 and the fourth substrate 44 may be spaced apart from each other by a certain gap g12 in the vertical direction, and the first reflective sheet 61 and the fourth reflective sheet 64 may be spaced apart from each other by a certain gap g12. In this case, the gap g12 may be formed to be elongated in the left-right direction. For example, the gap g12 may be about 12 mm. Accordingly, a gap may be provided between the plurality of substrates 40 and between the plurality of reflective sheets 60 in consideration of thermal expansion of the substrate and the reflective sheet.

A plurality of pins 832 may protrude from a flat plate portion 81 (see FIG. 20) and/or the heat sink 83 of the frame 80 toward the first plate 40a of the first substrate 41, and may be spaced apart from each other in the vertical direction. The plurality of pins 832 may be adjacent to the gap g11, and may penetrate the first plate 40a and the first reflective sheet 61. In this case, the plurality of holes 412a and 412b may be formed to penetrate the first plate 40a of the first substrate 41 in the front-rear direction, and the plurality of holes 612a and 612b may be formed to penetrate the first reflective sheet 61 in the front-rear direction. The holes 412a and 412b and the holes 612a and 612b may be arranged with each other in the front-rear direction and may have substantially the same diameter Db. In addition, the pin 832 may have a diameter Da that is substantially equal to or smaller than the diameter Db of the holes 412a and 412b, and may be inserted into the hole 412a, 412b and the second hole 612a, 612b. For example, the diameter Db may be larger than the diameter Da by 0.2 mm. Accordingly, the plurality of pins 832 may guide the coupling of the first substrate 41 and the first reflective sheet 61 with respect to the heat sink 83. Meanwhile, the pin 832 may be referred to as a protrusion.

For example, a recessed portion 831a may be formed while being depressed backward from the heat sink 83, and the pin 832 may be formed while being pressed forward from the recessed portion 831a. Accordingly, the pin 832 may be provided as a straight protrusion. Meanwhile, the recessed portion 831a may be referred to as a carving portion.

A plurality of bosses 834 may protrude forward from the flat plate portion 81 (see FIG. 20) 80 and/or the heat sink 83 of the frame, and may be spaced apart from each other in the vertical direction. The plurality of bosses 834 may be disposed between adjacent substrates 40. Meanwhile, the boss 834 may be referred to as a protrusion.

For example, the plurality of bosses 834a, 834b, 834c, and 834d may be located between the first substrate 41 and the second substrate 42. In this case, a plurality of first grooves 414a, 414b, 414c, and 414d may be formed in a first side of the first substrate 41 facing the second substrate 42. The plurality of first grooves 614a, 614b, 614c, and 614d may be formed in a first side of the first reflective sheet 61 toward the second reflective sheet 62. In addition, a plurality of second grooves (unsigned) may be formed in a second side of the second substrate 42 facing the first substrate 41. A plurality of second grooves (unsigned) may be formed in a second side of the second reflective sheet 62 facing the first reflective sheet 61. The plurality of bosses 834a, 834b, 834c, and 834d may be inserted into between the plurality of first grooves 414a, 414b, 414c, 414d; 614a, 614b, 614c, 614d and the plurality of second grooves.

Accordingly, the boss 834 may guide the coupling of the first and second substrates 41 and 42 and the first and second reflective sheets 61 and 62 with respect to the heat sink 83.

Meanwhile, a configuration such as the pin 832 and the boss 834 may be provided to guide the coupling of the remaining substrates 42, 43, 44, 45, 46, 47, 48, 49 (see FIG. 10) and the remaining reflective sheets 62, 63, 64, 65, 66, 67, 68, 69 (see FIG. 10) with respect to the heat sink 83 in addition to the first substrate 41 and the first reflective sheet 61.

Figure 15:
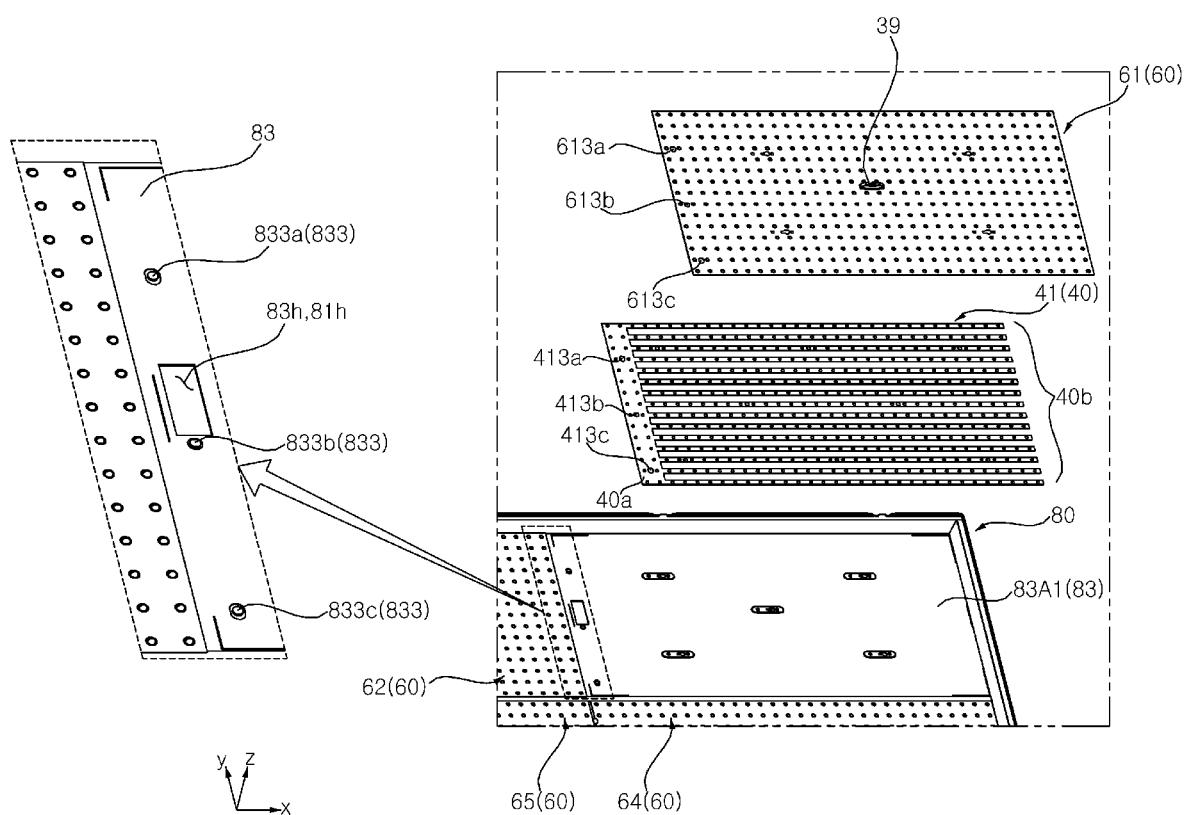
Figure 16:
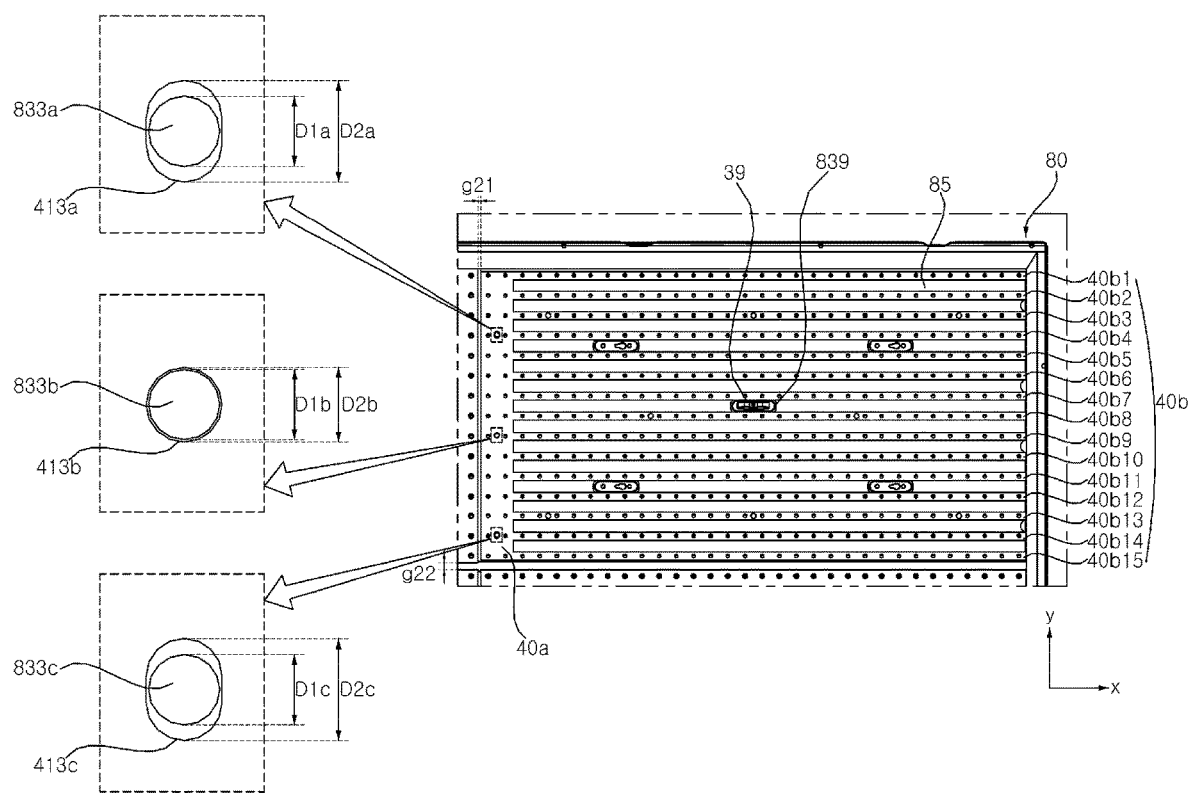

Referring to FIGS. 15 and 16, a plurality of adjacent substrates 40 may be spaced apart from each other, and a plurality of adjacent reflective sheets 60 may be spaced apart from each other. For example, the first substrate 41 and the second substrate 42 may be spaced apart from each other by a certain gap g21 in the left-right direction, and the first and second reflective sheets 61 and 62 may be disposed in the left-right direction. In this case, the gap g21 may be formed to be elongated in the vertical direction. For example, the gap g21 may be about 3 mm. Further, the first substrate 41 and the fourth substrate 44 may be spaced apart from each other by a certain gap g22 in the vertical direction, and the first reflective sheet 61 and the fourth reflective sheet 64 may be spaced apart from each other by a certain gap g22. In this case, the gap g22 may be formed to be elongated in the left-right direction. For example, the gap g22 may be about 12 mm. Accordingly, a gap may be provided between the plurality of substrates 40 and between the plurality of reflective sheets 60 in consideration of thermal expansion of the substrate and the reflective sheet.

A plurality of pins 833 protrude from the flat plate portion 81 (see FIG. 20) and/or the heat sink 83 of the frame 80 toward the first plate 40a of the first substrate 41, and may be spaced apart from each other in the vertical direction. The plurality of pins 833 may be adjacent to the gap g21 and may pass through the first plate 40a and the first reflective sheet 61. For example, the plurality of pins 833a, 833b, and 833c may include a first pin 833a, a second pin 833b, and a third pin 833c. The second pin 833b may be located between the first pin 833a and the third pin 833c, and the third pin 833c may face the first pin 833a with respect to the second pin 833b. Meanwhile, the pin 833 may be referred to as a protrusion.

In addition, the plurality of holes 413a, 413b, and 413c may be formed to penetrate the first plate 40a of the first substrate 41 in the front-rear direction. The first hole 413a may pass through the first pin 833a and may have a diameter D2a greater than the diameter D1a of the first pin 833a in the vertical direction. For example, the diameter D2a may be larger than the diameter D1a by 0.5 mm. The second hole 413b may pass through the second pin 833b and may have a diameter D2b substantially equal to or greater than the diameter D1b of the second pin 833b. For example, the diameter D2b may be larger than the diameter D1b by 0.2 mm. The third hole 413c may pass through the third pin 833c and may have a diameter D2c larger than the diameter D1c of the third pin 833c. For example, the diameter D2c may be larger than the diameter D1c by 0.5 mm.

In addition, the plurality of holes 613a, 613b, and 613c may be formed to penetrate the first reflective sheet 61 in the front-rear direction. The first hole 613a may pass through the first pin 833a and may have a diameter D2a larger than the diameter D1a of the first pin 833a in the vertical direction (see FIG. 17). For example, the diameter D2a may be larger than the diameter D1a by 0.5 mm. The second hole 613b may pass through the second pin 833b and may have a diameter D2b substantially equal to or greater than the diameter D1b of the second pin 833b (see FIG. 18). For example, the diameter D2b may be larger than the diameter D1b by 0.2 mm. The third hole 613c may pass through the third pin 833c and may have a diameter D2c larger than the diameter D1c of the third pin 833c. For example, the diameter D2c may be larger than the diameter D1c by 0.5 mm. For example, the height of the pin 833 with respect to the front surface of the heat sink 83 may be greater than the sum of the thicknesses of the first adhesive member 85, the first substrate 41, and the first reflective sheet 61 by 0.5 mm.

Accordingly, the plurality of pins 833 may guide the coupling of the first substrate 41 and the first reflective sheet 61 with respect to the heat sink 83. In addition, the first substrate 41 may be thermally expanded or restored in the vertical direction based on the second pin 833b.

Meanwhile, a configuration such as the above described pin 833 may be provided to guide the coupling of the remaining substrates 42, 43, 44, 45, 46, 47, 48, 49 (see FIG. 10) and the remaining reflective sheets 62, 63, 64, 65, 66, 67, 68, 69 (see FIG. 10) with respect to the heat sink 83 in addition to the first substrate 41 and the first reflective sheet 61.

Figure 17:
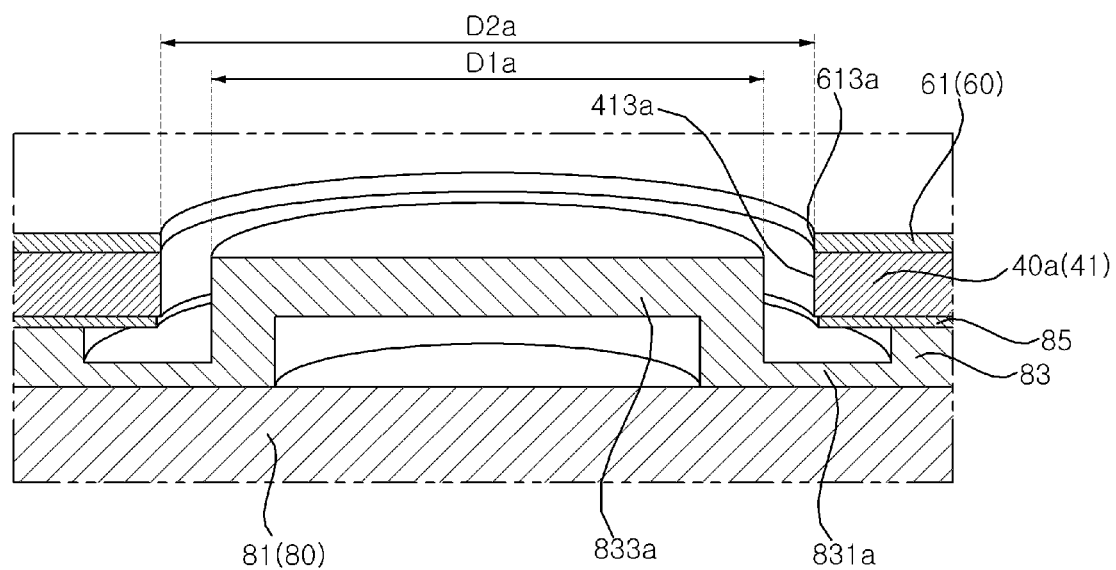
Figure 18:
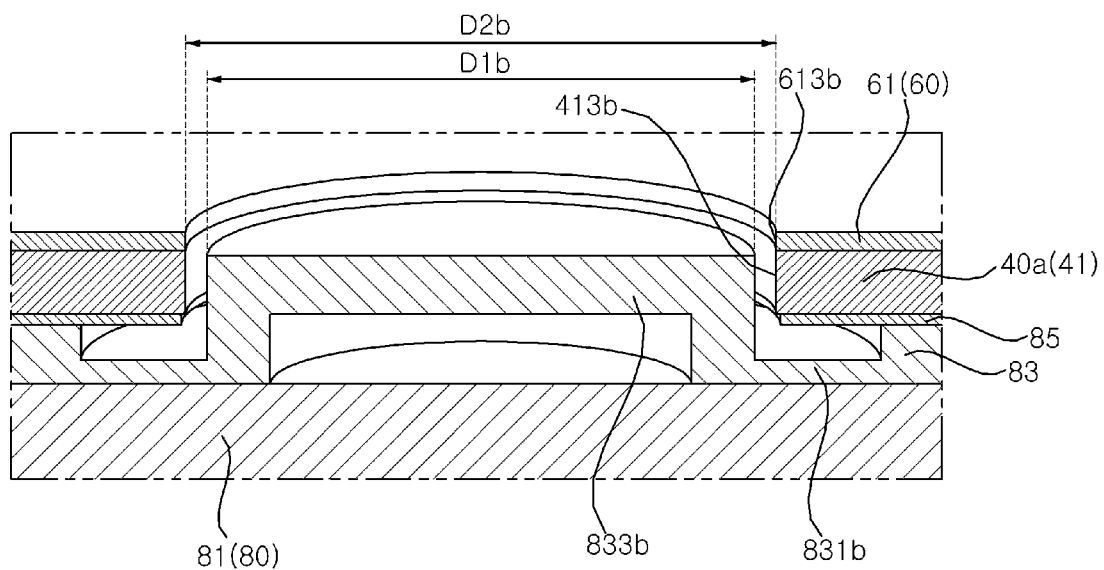

Referring to FIGS. 17 and 18, a first recessed portion 831a may be formed while being recessed backward from the heat sink 83, and the first pin 833a may be formed while being pressed forward from the first recessed portion 831a. Accordingly, the first pin 833a may be provided as a straight protrusion. The second recessed portion 831b may be formed while being recessed backward from the heat sink 83, and the second pin 833b may be formed while being pressed forward from the second recessed portion 831b. Accordingly, the second pin 833b may be provided as a straight protrusion. A third recessed portion (unsigned) may be formed while being recessed backward from the heat sink 83, and the third pin 833c may be formed while being pressed forward from the third recessed portion (see FIG. 15). Accordingly, the third pin 833c may be provided as a straight protrusion.

Meanwhile, the first recessed portion 831a, the second recessed portion 831b, and the third recessed portion may be referred to as a carving portion.

Figure 19:
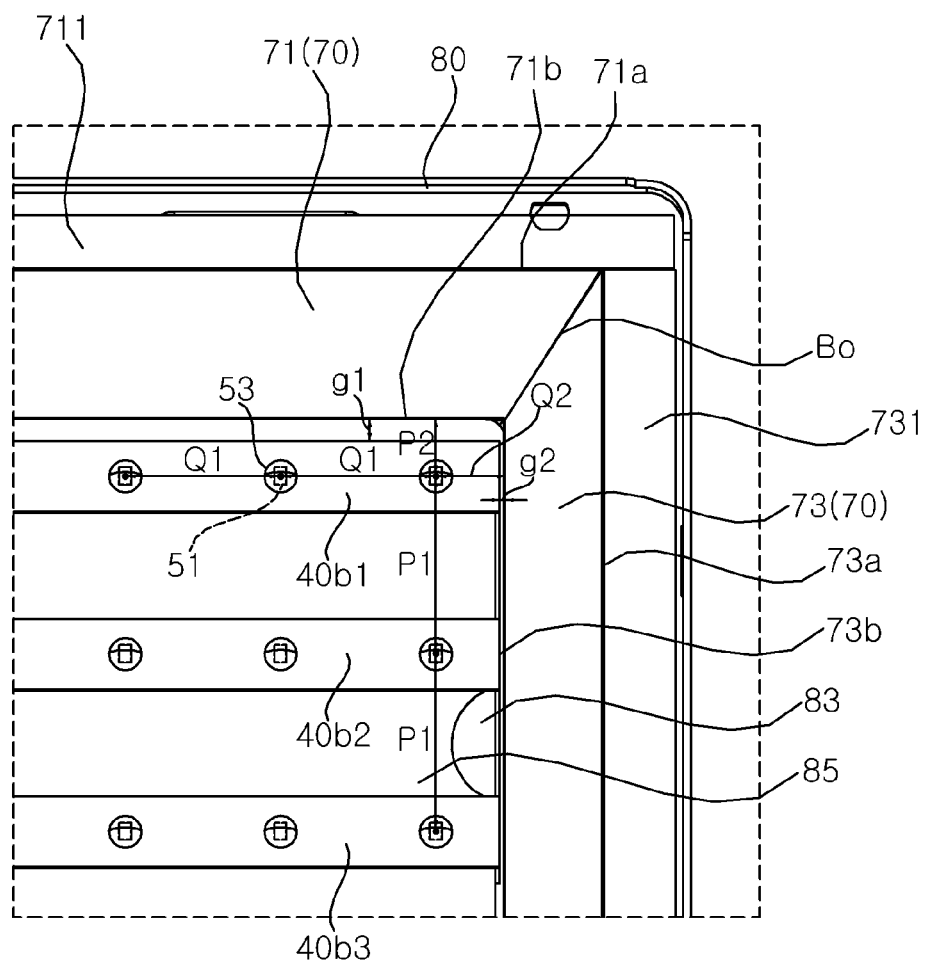

Referring to FIGS. 16 and 19, a plurality of second plates 40b may be sequentially arranged in the vertical direction. A second-first plate 40b1, a second-second plate 40b2, a second-third plate 40b3, a second-fourth plate 40b4, a second-fifth plate 40b5, a second-sixth plate 40b6, a second-seventh plate 40b7, a second-eighth plate 40b8, a second-ninth plate 40b9, a second-tenth plate 40b10, a second-11th plate 40b11, second-12th plate 40b12, a second-13th plate 40b13, a second-14th plate 40b14, and a second-15th plate 40b15 may be sequentially arranged in the vertical direction.

The plurality of light sources 51 may be mounted on the first plate 40a and the plurality of second plates 40b, and may be spaced apart from each other. The plurality of light sources 51 form rows and columns and may be located on the first plate 40a (see FIGS. 16 and 19) and the plurality of second plates 40b. The row may be defined in a left-right direction, and the column may be defined in a vertical direction. For example, the plurality of light sources 51 may be spaced apart from each other at a first gap P1 in the vertical direction, and may be spaced apart from each other at a second gap Q1 in the left-right direction. The first gap P1 and the second gap Q1 may be greater than the gap between the plurality of second plates 40b. For example, the first gap P1 may be substantially equal to the second gap Q1. For example, the light source 51 may be a light emitting diode (LED) chip or a package including at least one LED chip. For example, the light source 51 may be a colored LED that emits at least one color among colors such as red, blue, and green, or a white LED. For example, the light source 51 may be a mini LED.

Each of the plurality of lenses 53 may cover each of the plurality of light sources 51. A receiving portion (unsigned) may be formed in the lower surface of the lens 53 and may surround the light source 51. A dome portion (unsigned) may form an upper surface of the lens 53 and may have a substantially hemispherical shape. The lens 53 may include at least one of silicone, polymethyl methacrylate (PMMA), and polycarbonate (PC). The light provided from the light source 51 may be refracted or reflected by the lens 53 to spread at a direction angle wider than the light source 51. In addition, a sufficient amount of light can be secured in a wide range with respect to the number and position of the light source 51.

The size of the first reflective sheet 61 (see FIG. 15) may correspond to the size of the first substrate 41. For example, the size of the first reflective sheet 61 may be substantially equal to the size of the first substrate 41. That is, the first reflective sheet 61 may cover between the plurality of second plates 40b as well as the first plate 40a and the plurality of second plates 40b of the first substrate 41. Meanwhile, a plurality of lens holes 611 (see FIG. 2) may be formed to penetrate the first reflective sheet 61, and a plurality of lenses 53 may be disposed. Accordingly, a sufficient amount of light can be secured in a wide range with respect to the number and position of the light source 51 mounted on the first substrate 41. Meanwhile, a plurality of lens holes 611 (see FIG. 2) may be formed to penetrate the first reflective sheet 61, and a plurality of lenses 53 may be disposed.

Figure 20:
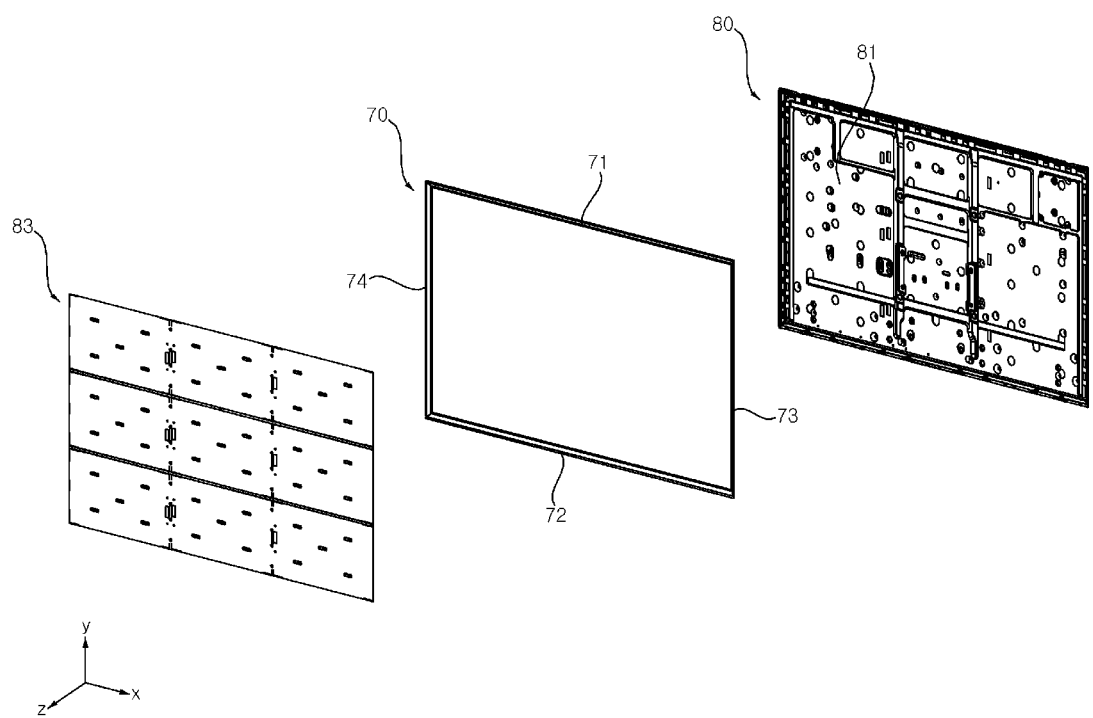

Referring to FIG. 20, the frame 80 may include a flat plate portion 81. The flat plate portion 81 may form a central area 7 of the frame 80. The heat sink 83 may be located in front of the flat plate portion 81 and may be coupled to the flat plate portion 81. That is, the heat sink 83 may be provided on the front surface of the flat plate portion 81. Meanwhile, a rigid portion (unsigned) may be formed while being pressed in the frame 80, and may improve torsional rigidity and/or bending rigidity of the frame 80.

A side portion 70 may be disposed in an edge of the heat sink 83. The side portion 70 may include at least one of a metal and a metal oxide which are reflective materials. For example, the side portion 70 may include a metal having a high reflectance such as at least one of aluminum (Al), silver (Ag), gold (Au), and titanium dioxide (TiO2) and/or a metal oxide. For example, a resin may be deposited or coated on the side portion 70, and may diffuse light of the light source 51 (see FIG. 19).

In addition, the side portion 70 may include a first side portion 71, a second side portion 72, a third side portion 73, and a fourth side portion 74. The first side portion 71 may extend along the upper side of the heat sink 83. The second side portion 72 may extend along the lower side of the heat sink 83. The third side portion 73 may extend along the left side of the heat sink 83. The fourth side portion 74 may extend along the right side of the heat sink 83. Meanwhile, the side portion 70 may be referred to as a chamfer portion.

Figure 21:
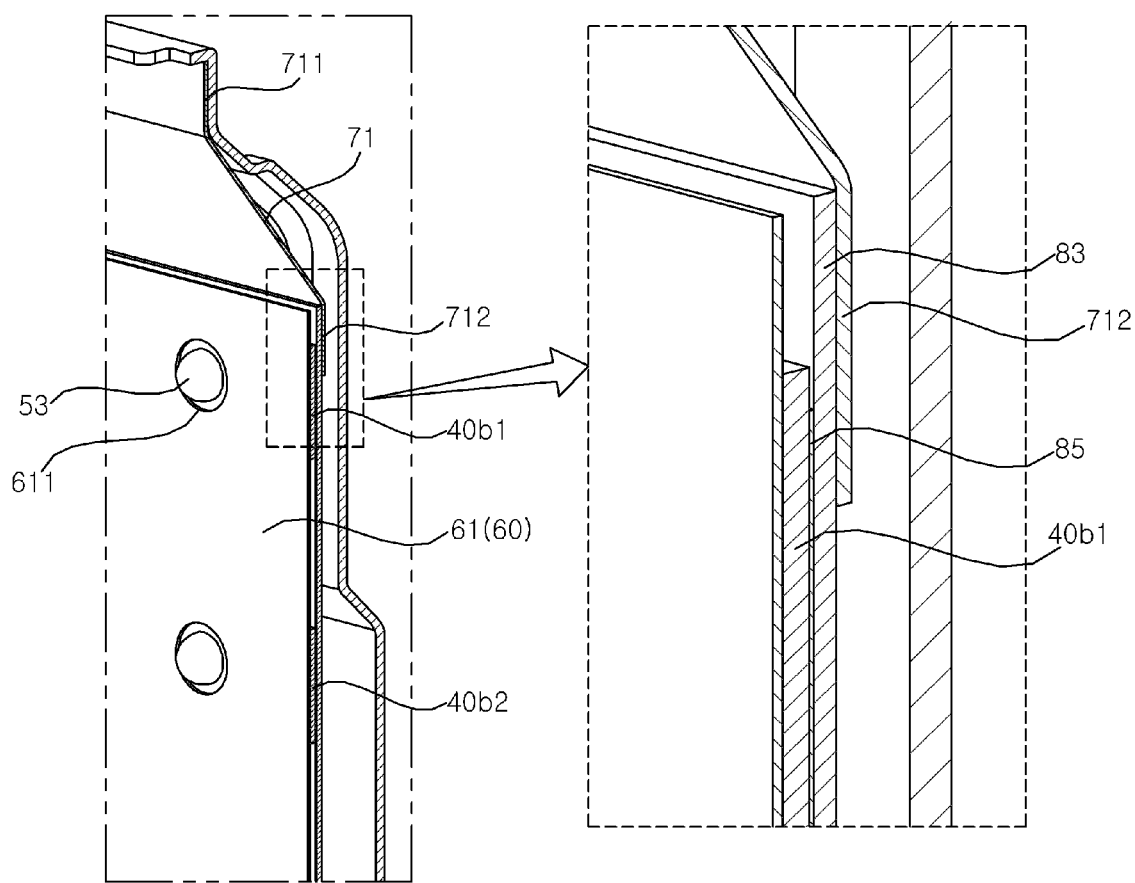

Referring to FIGS. 5 and 21, the frame 80 may include a press portion 811, a bending portion 812, and a first support portion 813a. The press portion 811 may be formed while being pressed from the front surface of the frame 80 to the rear. The press portion 811 may be spaced rearward from the heat sink 83. The bending portion 812 may be bent from the press portion 811 toward the display panel 10. An angle between the bending portion 812 and the press portion 811 may be an obtuse angle. The first support portion 813a may be bent toward the first part 21 from the bending portion 812. The first support portion 813a may be disposed in parallel to the first horizontal portion 21H at the rear of the first horizontal portion 21H. In addition, a coupling portion 211 may protrude from the first horizontal portion 21H toward the first support portion 813a, and may be coupled to the first horizontal portion 21H through a fastening member such as a screw. Meanwhile, the above mentioned upper end 80aa of the frame 80 may protrude from the first support portion 813a toward the first groove 21g. In addition, a light shield pad LP may face the upper end 80aa of the first support portion 813a and may be coupled to the inner side of the first vertical portion 21V.

The first side portion 71 may extend along the upper side of the heat sink 83 and may be disposed to be inclined toward the display panel 10 with respect to the heat sink 83. The first side portion 71 may form an obtuse angle with respect to the heat sink 83. In other words, the length of the first side portion 71 may be defined in the left-right direction, the width Wb1 of the first side portion 71 may be defined in a direction forming an obtuse angle with respect to the heat sink 83, and the thickness of the first side portion 71 may be defined in a direction orthogonal to the length direction and the width direction of the first side portion 71.

In addition, the reflective sheet 60 and the first side portion 71 may face the diffuser plate 31. In other words, the reflective sheet 60 and the first side portion 71 may overlap the diffuser plate 31, the optical sheet 32, and the display panel 10 in the front-rear direction. In this case, the light from the light source 51 (see FIG. 19) may be spread by the lens 53, may be reflected by the reflective sheet 60 and the first side portion 71, and may be provided to the diffuser plate 31, the optical sheet 32, and the display panel 10. Accordingly, the first side portion 71 may secure a sufficient amount of light in a portion relatively far from the lens 53.

In addition, the first side portion 71 may include a first seating portion 711 and a first locking portion 712. The first seating portion 711 may be bent upward from the front end of the first side portion 71, and may be located between the first horizontal portion 21H and the first support portion 813a. The first seating portion 711 may be disposed in parallel with the first support portion 813a and may be seated inside the first support portion 813a. In this case, a portion of the diffuser plate 31 may be in contact with the front surface of the first seating portion 711. In addition, a first protrusion 21Ha may protrude from the first horizontal portion 21H toward the first seating portion 711 and may be in contact with the front surface of the first seating portion 711. That is, a part of the diffuser plate 31 and the first protrusion 21Ha may press the first seating portion 711 toward the first support portion 813a. The first locking portion 712 may be bent downward from the rear end of the first side portion 71, and may be located between the heat sink 83 and the press portion 811. For example, the first locking portion 712 may be spaced apart from the press portion 811 in the front direction. The first locking portion 712 may be disposed in parallel with the heat sink 83 and may be in contact with the rear surface of the heat sink 83. That is, the first locking portion 712 may be caught on the rear surface of the heat sink 83. Accordingly, the first side portion 71 may be fixed to the heat sink 83 and the frame 80. For example, the width of the first seating portion 711 and the width of the first locking portion 712 may be smaller than the width Wb1 of the first side portion 71.

Referring back to FIGS. 6 and 20, the frame 80 may include a press portion 811, a bending portion 812, and a second support portion 813*b*. The press portion 811 may be formed while being pressed from the front to the rear of the frame 80. The press portion 811 may be spaced rearward from the heat sink 83. The bending portion 812 may be bent from the press portion 811 toward the display panel 10. The angle between the bending portion 812 and the press portion 811 may be an obtuse angle. The second support portion 813*b* may be bent from the bending portion 812 toward the second part 22. The second support portion 813*b* may be disposed in parallel to the second horizontal portion 22H at the rear of the second horizontal portion 22H. Meanwhile, the above mentioned lower end 80*bb* of frame 80 may protrude rearward from the second support portion 813*b*.

The second side portion 72 may extend along the lower side of the heat sink 83, and may be disposed to be inclined toward the display panel 10 with respect to the heat sink 83. The second side portion 82 may form an obtuse angle with respect to the heat sink 83. In other words, the length of the second side portion 72 may be defined in the left-right direction, the width Wb2 of the second side portion 72 may be defined in a direction forming an obtuse angle with respect to the heat sink 83, and the thickness of the second side portion 72 may be defined in a direction orthogonal to the length direction and the width direction of the second side portion 72.

In addition, the reflective sheet 60 and the second side portion 72 may face the diffuser plate 31. In other words, the reflective sheet 60 and the second side portion 72 may be overlapped with the diffuser plate 31, the optical sheet 32, and the display panel 10 in the front-rear direction. In this case, the light from the light source 51 (see FIG. 19) may be diffused by the lens 53, may be reflected by the reflective sheet 60 and the second side portion 72, and may be provided to the diffuser plate 31, the optical sheet 32, and the display panel 10. Accordingly, the second side portion 72 may secure a sufficient amount of light from a portion relatively far from the lens 53.

In addition, the second side portion 72 may include a second seating portion 721 and a second locking portion 722. The second seating portion 721 may be bent downward from the front end of the second side portion 72, and may be located between the second horizontal portion 22H and the second support portion 813*b*. The second seating portion 721 may be disposed in parallel with the second support portion 813*b* and may be seated inside the second support portion 813*b*. In this case, a part of the diffuser plate 31 may be in contact with the front surface of the second seating portion 721. In addition, the second protrusion (not shown) may protrude from the second horizontal portion 22H toward the second seating portion 721, and may be in contact with the front surface of the second seating portion 721. That is, the part of the diffuser plate 31 and the second protrusion may press the second seating portion 721 toward the second support portion 813*b*. The second locking portion 722 may be bent upward from the rear end of the second side portion 72, and may be located between the heat sink 83 and the press portion 811. For example, the second locking portion 722 may be spaced apart from the press portion 811 in the front direction. The second locking portion 722 may be disposed in parallel with the heat sink 83 and may be in contact with the rear surface of the heat sink 83. That is, the second locking portion 722 may be caught on the rear surface of the heat sink 83. Accordingly, the second side portion 72 may be fixed to the heat sink 83 and the frame 80. For example, the width of the second seating portion 721 and the width of the second locking portion 722 may be smaller than the width Wb2 of the second side portion 72.

Referring back to FIGS. 7 and 20, the frame 80 may include a press portion 811, a bending portion 812, and a third support portion 813*c*. The press portion 811 may be formed while being pressed from the front surface to the rear of the frame 80. The press portion 811 may be spaced rearward from the heat sink 83. The bending portion 812 may be bent from the press portion 811 toward the display panel 10. The angle between the bending portion 812 and the press portion 811 may be an obtuse angle. The third support portion 813*c* may be bent from the bending portion 812 toward the third part 23. The third support portion 813*c* may be disposed in parallel to the third horizontal portion 23H at the rear of the third horizontal portion 23H. Meanwhile, the left end 80*cc* of the above mentioned frame 80 may protrude from the third support portion 813*c* toward the third groove 23*g*. In addition, the light shield pad LP may face the left end 80*cc* of the third support portion 813*c* and may be coupled to the inner side of the third vertical portion 23V.

The third side portion 73 may extend along the left side of the heat sink 83, and may be disposed to be inclined toward the display panel 10 with respect to the heat sink 83. The third side portion 73 may form an obtuse angle with respect to the heat sink 83. In other words, the length of the third side portion 73 may be defined in the vertical direction, the width Wb3 of the third side portion 73 may be defined in a direction forming an obtuse angle with respect to the heat sink 83, and the thickness of the third side portion 73 may be defined in a direction orthogonal to the length direction and the width direction of the third side portion 73.

In addition, the reflective sheet 60 and the third side portion 73 may face the diffuser plate 31. In other words, the reflective sheet 60 and the third side portion 73 may overlap the diffuser plate 31, the optical sheet 32, and the display panel 10 in the front-rear direction. In this case, the light from the light source 51 (see FIG. 19) may be diffused by the lens 53, may be reflected by the reflective sheet 60 and the third side portion 73, and may be provided to the diffuser plate 31, the optical sheet 32, and the display panel 10. Accordingly, the third side portion 73 may secure a sufficient amount of light in a portion relatively far from the lens 53.

In addition, the third side portion 73 may include a third seating portion 731 and a third locking portion 732. The third seating portion 731 may be bent to the left at the front end of the third side portion 73, and may be located between the third horizontal portion 23H and the third support portion 813*c*. The third seating portion 731 may be disposed in parallel with the third support portion 813*c* and may be seated inside the third support portion 813*c*. In this case, a part of the diffuser plate 31 may be in contact with the front surface of the third seating portion 731. In addition, a third protrusion (not shown) may protrude from the third horizontal portion 23H toward the third seating portion 731, and may be in contact with the front surface of the third seating portion 731. That is, a part of the diffuser plate 31 and the third protrusion may press the third seating portion 731 toward the third support portion 813*c*. The third locking portion 732 may be bent to the right at the rear end of the third side portion 73, and may be located between the heat sink 83 and the press portion 811. For example, the third locking portion 732 may be spaced apart from the press portion 811 in the front direction. The third locking portion 732 may be disposed in parallel with the heat sink 83 and may be in contact with the rear surface of the heat sink 83. That is, the third locking portion 732 may be caught on the rear surface of the heat sink 83. Accordingly, the third side portion 73 may be fixed to the heat sink 83 and the frame 80. For example, the width of the third seating portion 731 and the width of the third locking portion 732 may be smaller than the width Wb3 of the third side portion 73.

Referring back to FIGS. 8 and 20, the frame 80 may include a press portion 811, a bending portion 812, and a fourth support portion 813d. The press portion 811 may be formed while being pressed from the front surface to the rear of the frame 80. The press portion 811 may be spaced rearward from the heat sink 83. The bending portion 812 may be bent from the press portion 811 toward the display panel 10. The angle between the bending portion 812 and the press portion 811 may be an obtuse angle. The fourth support portion 813d may be bent from the bending portion 812 toward the fourth part 24. The fourth support portion 813d may be disposed in parallel to the fourth horizontal portion 24H at the rear of the fourth horizontal portion 24H. Meanwhile, the above mentioned right end 80dd of frame 80 may protrude from the fourth support 813d toward the fourth groove 24g. In addition, the light shield pad LP may face the right end 80dd with respect to the fourth support portion 813d and may be coupled to the inner side of the fourth vertical portion 24V.

The fourth side portion 74 may extend along the right side of the heat sink 83, and may be disposed to be inclined toward the display panel 10 with respect to the heat sink 83. The fourth side portion 74 may form an obtuse angle with respect to the heat sink 83. In other words, the length of the fourth side portion 74 may be defined in the vertical direction, the width Wb4 of the fourth side portion 74 may be defined in a direction forming an obtuse angle with respect to the heat sink 83, and the thickness of the fourth side portion 73 may be defined in a direction orthogonal to the length direction and the width direction of the fourth side portion 73.

In addition, the reflective sheet 60 and the fourth side portion 74 may face the diffuser plate 31. In other words, the reflective sheet 60 and the fourth side portion 74 may overlap the diffuser plate 31, the optical sheet 32, and the display panel 10 in the front-rear direction. In this case, the light from the light source 51 (see FIG. 19) may be spread by the lens 53, may be reflected by the reflective sheet 60 and the fourth side portion 74, and may be provided to the diffuser plate 31, the optical sheet 32, and the display panel 10. Accordingly, the fourth side portion 74 can secure a sufficient amount of light in a portion relatively far from the lens 53.

In addition, the fourth side portion 74 may include a fourth seating portion 741 and a fourth locking portion 742. The fourth seating portion 741 may be bent to the right at the front end of the fourth side portion 74, and may be located between the fourth horizontal portion 24H and the fourth support portion 813d. The fourth seating portion 741 may be disposed in parallel with the fourth support portion 813d, and may be seated inside the fourth support portion 813d. In this case, a part of the diffuser plate 31 may be in contact with the front surface of the fourth seating portion 741. In addition, a fourth protrusion (not shown) may protrude from the fourth horizontal portion 24H toward the fourth seating portion 741, and may be in contact with the front surface of the fourth seating portion 741. That is, a part of the diffuser plate 31 and the fourth protrusion may press the fourth seating portion 741 toward the fourth support portion 813d. The fourth locking portion 742 may be bent to the left at the rear end of the fourth side portion 74, and may be located between the heat sink 83 and the press portion 811. For example, the fourth locking portion 742 may be spaced apart from the press portion 811 in the front direction. The fourth locking portion 742 may be disposed in parallel with the heat sink 83 and may be in contact with the rear surface of the heat sink 83. That is, the fourth locking portion 742 may be caught on the rear surface of the heat sink 83. Accordingly, the fourth side portion 74 may be fixed to the heat sink 83 and the frame 80. For example, the width of the fourth seating portion 741 and the width of the fourth locking portion 742 may be smaller than the width Wb4 of the fourth side portion 73.

Figure 22:
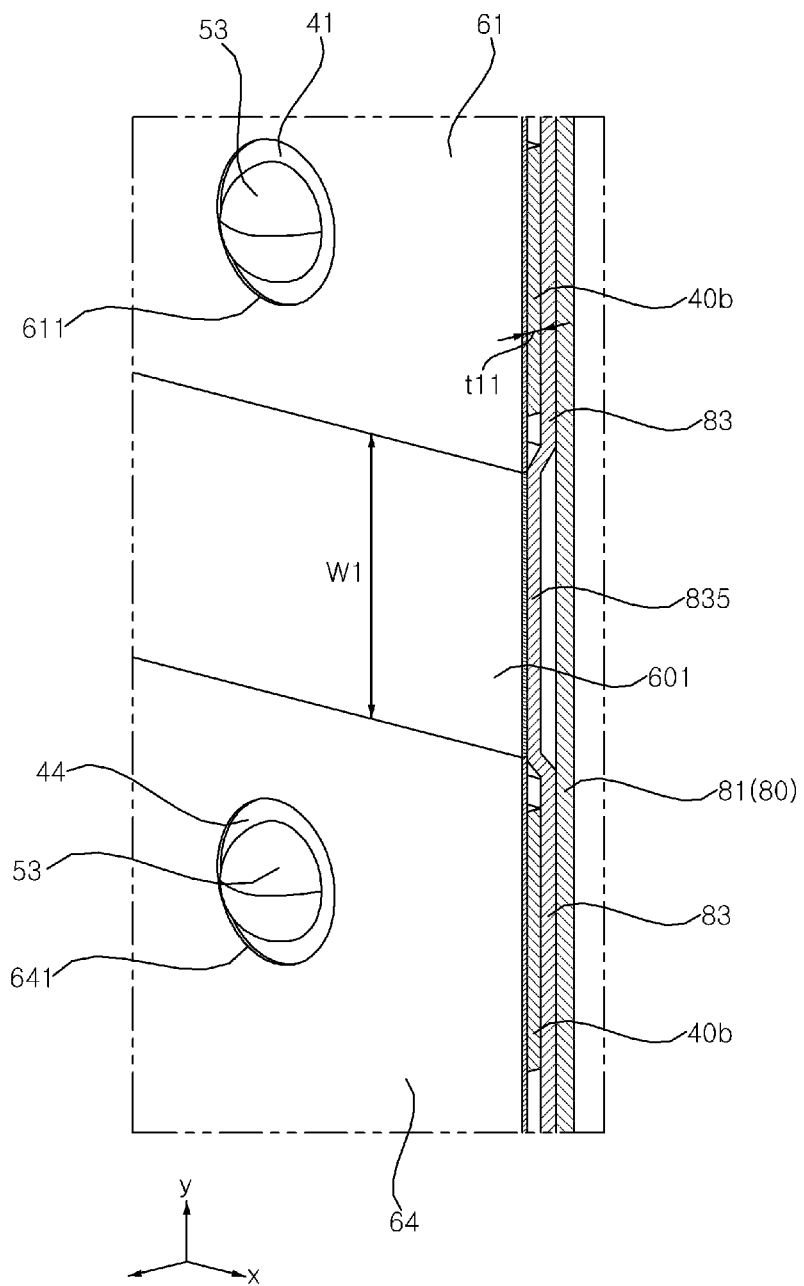

Referring to FIG. 22, a forming portion 835 may be formed while being pressed from the heat sink 83 in a front direction. A distance between the front surface of the heat sink 83 and the front surface of the forming portion 835 may be substantially equal to the thickness t11 of the second plate 40b. The forming portion 835 may be located between the reflective sheets 60 adjacent to each other in the vertical direction. For example, the forming portion 835 may be located between the first reflective sheet 61 and the fourth reflective sheet 64.

A first horizontal reflective sheet 601 may be located between the first reflective sheet 61 and the fourth reflective sheet 64, and may be coupled to the front surface of the forming portion 835. For example, the first horizontal reflective sheet 601 may be coupled to the front surface of the forming unit 835 through an adhesive member such as a double-sided tape. The width W1 of the first horizontal reflective sheet 601 may be substantially equal to a distance between the first reflective sheet 61 and the fourth reflective sheet 64. The thickness of the first horizontal reflective sheet 601 may be substantially equal to the thickness of the first reflective sheet 61 and the fourth reflective sheet 64. The first horizontal reflective sheet 601 may include a reflective material such as the reflective sheet 60.

In addition, the first horizontal reflective sheet 601 may extend in the left-right direction. In this case, the first horizontal reflective sheet 601 may be located between the first reflective sheet 61 and the fourth reflective sheet 64, between the second reflective sheet 62 and the fifth reflective sheet 65, and between the third reflective sheet 63 and the sixth reflective sheet 66 (see FIG. 9). In addition, a second horizontal reflective sheet 602 may be located in the lower side of the first horizontal reflective sheet 601, and may be provided in the same manner as the first horizontal reflective sheet 601. In this case, the second horizontal reflective sheet 602 may be located between a fourth reflective sheet 64 and a seventh reflective sheet 67, between a fifth reflective sheet 65 and an eighth reflective sheet 68, and a sixth reflective sheet 66 and a ninth reflective sheet 69 (see FIG. 9).

Accordingly, the first horizontal reflective sheet 601 and the second horizontal reflective sheet 602 may reflect light between the reflective sheets 60 adjacent to each other in the vertical direction.

Meanwhile, the first vertical reflective sheet 603 and the second vertical reflective sheet 604 may intersect with the first horizontal reflective sheet 601 and the second horizontal reflective sheet 602 (see FIG. 9). In this case, the first vertical reflective sheet 603 may extend in the vertical direction, and may be located between the first reflective sheet 61 and the second reflective sheet 62, between the fourth reflective sheet 64 and the fifth reflective sheet 65, and between the seventh reflective sheet 67 and the eighth reflective sheet 68. In addition, the second vertical reflective sheet 604 may extend in the vertical direction, and may be located between the second reflective sheet 62 and the third reflective sheet 63, between the fifth reflective sheet 65 and the sixth reflective sheet 66, and between the eighth reflective sheet 68 and the ninth reflective sheet 69.

Accordingly, the first vertical reflective sheet 603 and the second vertical reflective sheet 604 may reflect light, from between the reflective sheets 60 adjacent to each other in the left-right direction. Meanwhile, the first vertical reflective sheet 603 and the second vertical reflective sheet 604 may be omitted.

Figure 23:
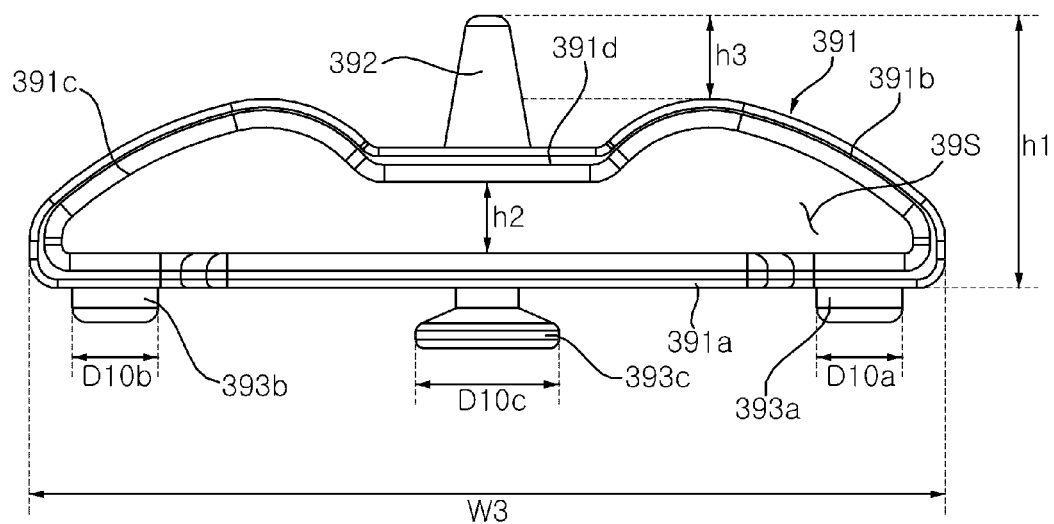

Referring to FIGS. 16 and 23, the supporter 39 may be located between the plurality of second plates 40b, and may extend in the length direction of the plurality of second plates 40b, i.e., in the left-right direction. The supporter 39 may have elasticity. The supporter 39 may include a body 391, a head 392, a fastening portion 393c, a first protrusion 393a, and a second protrusion 393b.

The body 391 may form a closed loop, and may include a first body 391a, a second body 391b, a third body 393c, and a fourth body 391d. The first body 391a, the second body 391b, the third body 393c, and the fourth body 391d may define a boundary of an internal space 39S of the body 391. The first body 391a may form a lower surface of the body 391 and may be located on the reflective sheet 60 (see FIGS. 12 and 15). The width W3 of the first body 391 may be the width of the supporter 39. For example, the width W3 may be 32 mm. The second body 391b may be bent at one end of the first body 391a and may face the first body 391a. The third body 391c may be bent at the other end of the first body 391a and may face the first body 391a. The fourth body 391d may be recessed toward the first body 391a from the second body 391b and the third body 391c, and may be disposed parallel to the first body 391a.

The head 392 may protrude forward from the fourth body 391d, and the front end of the head 392 may be adjacent to or in contact with the rear surface of the diffuser plate 31 (see FIG. 2). In this case, an air gap corresponding to a distance h1 between the rear surface of the first body 391a and the front end of the head 392 may be formed between the reflective sheet 60 and the diffuser plate 31. For example, the distance h1 may be 9.5 mm. At this time, a distance h2 between the inner side of the first body 391a and the inner side of the fourth body 391d may be smaller than a distance h3 between the front end of the second body 391b or the third body 391c and the front end of the head 392. For example, the distance h2 may be 2.5 mm, and the distance h3 may be 2.9 mm.

The fastening portion 393c may protrude to the rear side from a central portion of the first body 391a. The fastening portion 393c includes an insertion portion (unsigned) forming a maximum diameter D10c of the fastening portion 393c, and a fixing portion (unsigned) located between the insertion portion and the first body 391a. The first protrusion 393a may protrude to the rear side from a portion adjacent to one end of the first body 391a, and may be spaced apart from the fastening portion 393c to the left. The second protrusion 393b may protrude to the rear side from a portion adjacent to the other end of the first body 391a, and may be spaced apart from the fastening portion 393c to the right. The diameter D10a of the first protrusion 393a and the diameter D10b of the second protrusion 393b may be smaller than the diameter D10c of the insertion portion.

Figure 24:
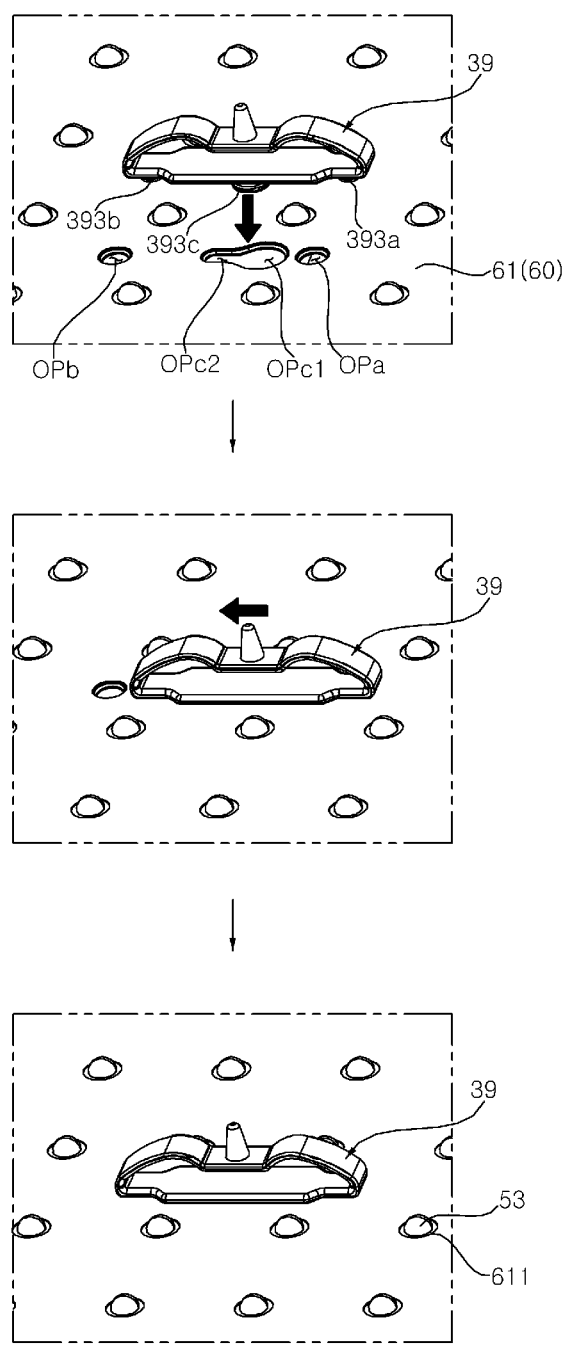
Figure 25:
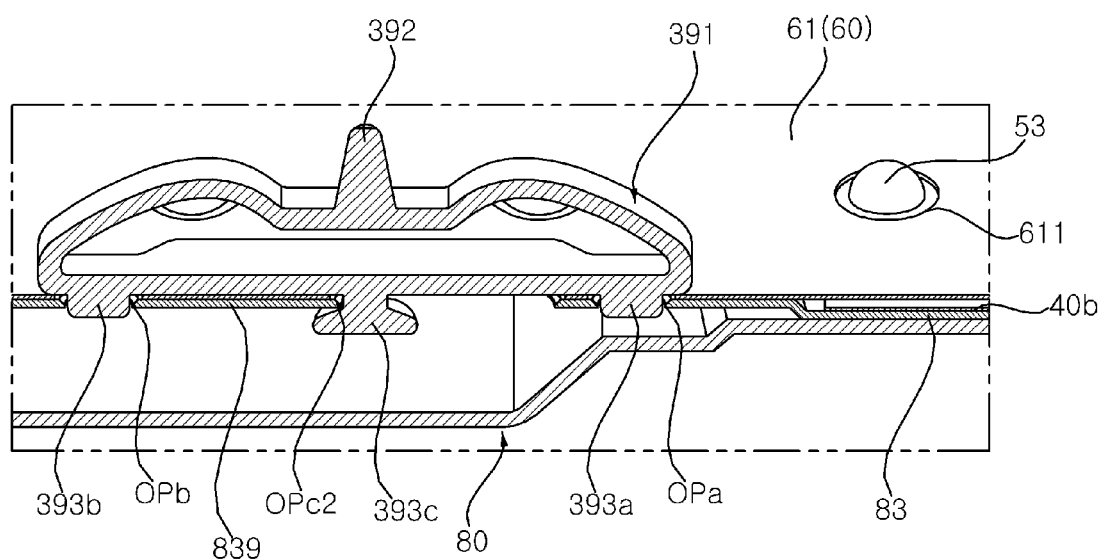

Referring to FIGS. 24 and 25, a mount 839 may be provided in the heat sink 83, and the supporter 39 may be fastened thereto.

A first slot OPc1 may be formed by penetrating the reflective sheet 60 and the mount 839 in the front-rear direction. The first slot OPc1 may be substantially equal to or larger than the diameter D10c (see FIG. 23) of the insertion portion. A second slot OPc2 may be formed to penetrate the reflective sheet 60 and the mount 839 in the front-rear direction, and may be connected to one end of the first slot OPc1 in the left-right direction. The second slot OPc2 may be smaller than a diameter D10c of the insertion portion (see FIG. 23).

A first fixing hole OPa may be formed to penetrate the reflective sheet 60 and the mount 839 in the front-rear direction, and may be spaced apart from the first slot OPc1 and the second slot OPc2 to the left. The first fixing hole OPa may be substantially equal to or larger than the diameter D10a (see FIG. 23) of the first protrusion 393a. A second fixing hole OPb may be formed to penetrate the reflective sheet 60 and the mount 839 in the front-rear direction, and may be spaced apart from the first slot OPc1 and the second slot OPc2 to the right. The second fixing hole OPb may be substantially equal to or larger than the diameter D10b (see FIG. 23) of the second protrusion 393b.

In this case, the fastening portion 393c may be inserted into the first slot OPc1 and may slide toward the second slot OPc2. In addition, the fixing portion of the fastening portion 393c may be caught in the second slot OPc2, and each of the first protrusion 393a and the second protrusion 393b may be inserted into each of the first fixing hole OPa and the second fixing hole OPb.

Accordingly, the supporter 39 may be fixed on the reflective sheet 60. In addition, the supporter 39 may form an air gap between the above-described diffuser plate 31 and the reflective sheet 60 and prevent the reflective sheet 60 from floating. In addition, the coupling and separation of the supporter 39 with respect to the above-described mount 839 may be performed in the length direction of the second plate 40b between the plurality of second plates 40b (see FIG. 16). In other words, the substrate 40 can be prevented from being damaged due to the coupling and separation of the supporter 39 with respect to the mount 839.

Referring to FIGS. 1 to 25, according to an aspect of the present disclosure, a display device may include: a display panel; a frame which is located in a rear of the display panel and to which the display panel is coupled; a substrate which is located between the display panel and the frame and coupled to the frame; and a plurality of light sources which are mounted on the substrate and spaced apart from each other, wherein the substrate may include: an elongated first plate; and a plurality of second plates which extend from the first plate in a direction intersecting with a length direction of the first plate, and are spaced apart from each other in the length direction of the first plate.

According to another aspect of the present disclosure, the display device may further include a heat sink which is located between the substrate and the frame, and coupled to the substrate and the frame, wherein the heat sink may include a plurality of protrusions that protrudes from the heat sink toward the first plate and penetrates the first plate.

According to another aspect of the present disclosure, the substrate may include a plurality of substrates which are adjacent to each other while being spaced apart from each other.

According to another aspect of the present disclosure, the plurality of substrates may include: a first substrate; and a second substrate adjacent to the first substrate, wherein a gap between the first substrate and the second substrate may be formed in a direction parallel to the first substrate and the second substrate.

According to another aspect of the present disclosure, the plurality of protrusions may include: a plurality of pins which protrude from the heat sink toward the first plate of the first substrate and are spaced apart from each other, wherein the plurality of pins may be adjacent to the gap and may penetrate the first plate of the first substrate.

According to another aspect of the present disclosure, the heat sink may include a recessed portion which is formed in the heat sink while being recessed toward the frame, wherein the plurality of pins may be formed in the recessed portion while being pressed toward the first substrate.

According to another aspect of the present disclosure, the first substrate may include: a plurality of holes which are formed to penetrate the first plate of the first substrate, and into which the plurality of pins are inserted, wherein a diameter of the hole may be substantially equal to a diameter of the pin.

According to another aspect of the present disclosure, the plurality of protrusions may include: a plurality of bosses which protrude from the heat sink toward between the first substrate and the second substrate, and are spaced apart from each other in a length direction of the gap, wherein the first substrate may include: a first side which faces the second substrate and has a plurality of first grooves spaced apart from each other in the length direction of the gap, wherein the second substrate may include: a second side which faces the first substrate and has a plurality of second grooves spaced apart from each other in the length direction of the gap, wherein the boss may be inserted into between the first groove and the second groove.

According to another aspect of the present disclosure, the plurality of pins may include: a first pin; a second pin spaced apart from the first pin; and a third pin opposite to the first pin with respect to the second pin, wherein the first substrate may include: a first hole through which the first pin passes, and which is larger than the first pin in a direction in which the plurality of pins are spaced apart from each other; a second hole through which the second pin passes, and has a diameter substantially equal to that of the second pin; and a third hole through which the third pin passes, and which is larger than the third pin in a direction in which the plurality of pins are spaced apart from each other.

According to another aspect of the present disclosure, the display device may further include a plurality of reflective sheets which are coupled to the plurality of substrates, and in which the plurality of light sources are located, wherein the plurality of protrusions may penetrate the plurality of substrates and the plurality of reflective sheets sequentially.

According to another aspect of the present disclosure, the display device may further include a supporter located on the reflective sheet, wherein a part of the supporter penetrates the reflective sheet and is fastened to the heat sink; and a diffuser plate 31 which is located between the display panel and the reflective sheet, and adjacent to or in contact with a front end of the supporter, wherein the supporter may be located between the plurality of second plates.

According to another aspect of the present disclosure, the supporter may extend in a length direction of the plurality of second plates, wherein the supporter may include: a fastening portion protruding from the supporter into between the plurality of second plates; a first protrusion spaced apart from the fastening portion in a length direction of the supporter; and a second protrusion opposite to the first protrusion with respect to the fastening portion, wherein the heat sink may include: a first slot equal to or larger than a diameter of the fastening portion; a second slot which is connected to the first slot in the length direction of the supporter and smaller than the diameter of the fastening portion; a first fixing hole into which the first protrusion is inserted; and a second fixing hole into which the second protrusion is inserted, wherein a portion between the supporter and the fastening portion may be detachably caught in the second slot.

According to another aspect of the present disclosure, the display device may further include a side portion which extends along a circumference of the plurality of reflective sheets and is disposed to be inclined toward the display panel with respect to the plurality of reflective sheets, wherein the side portion may include a reflective material.

According to another aspect of the present disclosure, the display device may further include a horizontal reflection sheet which extends in the length direction of the second plate and is located between the plurality of reflection sheets in the length direction of the first plate.

According to another aspect of the present disclosure, the display device may further include a connector mounted on a rear surface of the first plate.

The effect of the display device according to the present disclosure will be described as follows.

According to at least one of the embodiments of the present disclosure, it is possible to provide a display device capable of reducing manufacturing cost or process cost of a substrate.

According to at least one of the embodiments of the present disclosure, it is possible to provide a display device capable of easily coupling a substrate and a reflective sheet with respect to a frame.

According to at least one of the embodiments of the present disclosure, it is possible to provide a display device capable of providing a gap in consideration of thermal expansion of a plurality of substrates.

According to at least one of the embodiments of the present disclosure, it is possible to provide a display device capable of minimizing formation of dark portion between a plurality of substrates.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame which is located in a rear of the display panel and to which the display panel is coupled;
   a substrate which is located between the display panel and the frame and which is coupled to the frame; and a plurality of light sources which are mounted on the substrate and which are spaced apart from each other;
a reflective sheet which is coupled to the substrate, and in which the plurality of light sources are located; and
a heat sink which is located between the substrate and the frame, and which is coupled to the substrate and the frame,
wherein the substrate comprises:
a first plate which is elongated in a first direction; and
a plurality of second plates which extend from the first plate in a second direction intersecting the first direction, and are spaced apart from each other in the first direction, and
wherein the heat sink comprises a plurality of protrusions that protrude from the heat sink toward the first plate and which penetrate the first plate and the reflective sheet sequentially.

2. The display device of claim 1, wherein the substrate comprises a plurality of substrates which are adjacent to each other while being spaced apart from each other.

3. The display device of claim 2, wherein the plurality of substrates comprises:
a first substrate; and
a second substrate adjacent to the first substrate,
wherein a gap between the first substrate and the second substrate is formed in a direction parallel to the first substrate and the second substrate.

4. The display device of claim 3, wherein the plurality of protrusions comprises:
a plurality of pins which protrude from the heat sink toward the first plate of the first substrate and which are spaced apart from each other,
wherein the plurality of pins are adjacent to the gap and penetrate the first plate of the first substrate.

5. The display device of claim 4, wherein the heat sink comprises:
a recessed portion which is formed in the heat sink while being recessed toward the frame,
wherein the plurality of pins are formed in the recessed portion while being pressed toward the first substrate.

6. The display device of claim 4, wherein the first substrate comprises:
a plurality of holes which are formed to penetrate the first plate of the first substrate, and into which corresponding ones of the plurality of pins are inserted,
wherein a diameter of each of plurality of holes is substantially equal to a diameter of the corresponding ones of the plurality of pins.

7. The display device of claim 6, wherein the plurality of protrusions comprises:
a plurality of bosses which protrude from the heat sink toward the first substrate and the second substrate, and which are spaced apart from each other in a length direction of the gap,
wherein the first substrate comprises:
a first side which faces the second substrate and which has a plurality of first grooves spaced apart from each other in the length direction of the gap,
wherein the second substrate comprises:
a second side which faces the first substrate and which has a plurality of second grooves spaced apart from each other in the length direction of the gap,
wherein the plurality of bosses is inserted into corresponding positions between the first groove and the second groove.

8. The display device of claim 4, wherein the plurality of pins comprises:
a first pin;
a second pin spaced apart from the first pin; and
a third pin opposite to the first pin with respect to the second pin,
wherein the first substrate comprises:
a first hole through which the first pin passes, and which is larger than the first pin in a direction in which the plurality of pins are spaced apart from each other;
a second hole through which the second pin passes, and has a diameter substantially equal to that of the second pin; and
a third hole through which the third pin passes, and which is larger than the third pin in a direction in which the plurality of pins are spaced apart from each other.

9. The display device of claim 2,
wherein the reflective sheet comprises a plurality of reflective sheets which are respectively coupled to the plurality of substrates, and in which the plurality of light sources are located.

10. The display device of claim 9, further comprising:
a supporter located on at least one of the plurality of reflective sheets,
wherein a part of the supporter penetrates the at least one of the plurality of reflective sheets and is fastened to the heat sink; and
a diffuser plate which is located between the display panel and the at least one of the plurality of reflective sheets, and which is adjacent to or in contact with a front end of the supporter,
wherein the supporter is located between the plurality of second plates.

11. The display device of claim 10,
wherein the supporter extends in the second direction,
wherein the supporter comprises:
a fastening portion protruding from the supporter into and between the plurality of second plates;
a first protrusion spaced apart from the fastening portion in a length direction of the supporter; and
a second protrusion opposite to the first protrusion with respect to the fastening portion,
wherein the heat sink comprises:
a first slot equal to or larger than a diameter of the fastening portion;
a second slot which is connected to the first slot in the length direction of the supporter and smaller than the diameter of the fastening portion;
a first fixing hole into which the first protrusion is inserted; and
a second fixing hole into which the second protrusion is inserted,
wherein a portion between the supporter and the fastening portion is detachably caught in the second slot.

12. The display device of claim 9, further comprising:
a side portion which extends along a circumference of the plurality of reflective sheets and which is disposed to be inclined toward the display panel with respect to the plurality of reflective sheets,
wherein the side portion comprises a reflective material.

13. The display device of claim 12, further comprising:
a horizontal reflection sheet which extends in the second direction and is located between the plurality of reflection sheets in the first direction.

14. The display device of claim 1, further comprising:
a connector mounted on a rear surface of the first plate.

* * * * *